(12) United States Patent
Ono et al.

(10) Patent No.: US 8,690,360 B2
(45) Date of Patent: Apr. 8, 2014

(54) HIGH PRESSURE DISCHARGE LAMP WITH START-UP ASSIST MEMBER, LAMP UNIT, LAMP SYSTEM, AND PROJECTOR

(75) Inventors: Syunsuke Ono, Osaka (JP); Masahiro Yamamoto, Osaka (JP); Hiroki Ogawa, Osaka (JP); Kazuyuki Okano, Nara (JP)

(73) Assignee: Panasonic Corporation, Osaka (JP)

( * ) Notice: Subject to any disclaimer, the term of this patent is extended or adjusted under 35 U.S.C. 154(b) by 139 days.

(21) Appl. No.: 13/393,786

(22) PCT Filed: Jul. 6, 2011

(86) PCT No.: PCT/JP2011/003881
§ 371 (c)(1),
(2), (4) Date: Mar. 1, 2012

(87) PCT Pub. No.: WO2012/090344
PCT Pub. Date: Jul. 5, 2012

(65) Prior Publication Data
US 2012/0218526 A1 Aug. 30, 2012

(51) Int. Cl.
*G03B 21/28* (2006.01)
(52) U.S. Cl.
USPC ............ 353/99; 353/85; 353/98; 353/119; 353/122; 313/634; 313/594
(58) Field of Classification Search
USPC ........ 353/85, 98, 99, 119, 122; 313/570, 634, 313/25, 594, 601, 602, 603, 607, 592, 637, 313/234; 315/330, 335, 336, 60, 73
See application file for complete search history.

(56) References Cited

U.S. PATENT DOCUMENTS

| | | | |
|---|---|---|---|
| 6,919,686 B2 * | 7/2005 | Okamoto et al. | 313/594 |
| 7,025,464 B2 * | 4/2006 | Beeson et al. | 353/98 |
| 2004/0095069 A1 | 5/2004 | Yamashita et al. | |
| 2004/0119412 A1 | 6/2004 | Katou et al. | |
| 2005/0036318 A1 | 2/2005 | Fujisawa et al. | |

(Continued)

FOREIGN PATENT DOCUMENTS

| | | |
|---|---|---|
| CN | 1489177 | 4/2004 |
| CN | 1508837 | 6/2004 |

(Continued)

OTHER PUBLICATIONS

Chinese Application No. 201180003528.9 Office Action dated Sep. 5, 2013, 10 pages including partial English translation.

*Primary Examiner* — Sultan Chowdhury

(57) ABSTRACT

The present invention provides a high pressure discharge lamp with a start-up assist member, a lamp unit, and a lamp system that reduce breakdown voltage and provide high design flexibility by reducing restriction on a position of an adjacent conductor. In a high pressure discharge lamp (10) of a lamp unit (1), a dielectric member (20) is on the outer surface of a first sealing part (101*a*). The dielectric member (20) made of a titanium compound has relative permittivity higher than that of fused quartz. An upstream end of a metal wire (21) is connected to an external lead wire (102*b*) projecting from a second sealing part (101*b*). A downstream end (21A) is in contact with the dielectric member (20). Upon lighting of the lamp, a corona discharge occurs at the point where the end (21*a*) is in contact with the dielectric member (20) so that breakdown voltage is reduced.

21 Claims, 16 Drawing Sheets

(56) References Cited

U.S. PATENT DOCUMENTS

| | | |
|---|---|---|
| 2006/0197475 A1 | 9/2006 | Yamamoto et al. |
| 2008/0258622 A1 | 10/2008 | Yamamoto et al. |
| 2010/0013369 A1* | 1/2010 | Kitahara et al. .............. 313/113 |
| 2010/0134766 A1* | 6/2010 | Takezawa ....................... 353/85 |
| 2010/0171421 A1* | 7/2010 | Nakagawa et al. ........... 313/623 |
| 2010/0181926 A1 | 7/2010 | Ozasa et al. |

FOREIGN PATENT DOCUMENTS

| | | |
|---|---|---|
| CN | 1791835 | 6/2006 |
| JP | 2002-151006 | 5/2002 |
| JP | 2004-139955 | 5/2004 |
| JP | 3938038 | 4/2007 |
| JP | 2009-181927 | 8/2009 |
| WO | 2004/090934 | 10/2004 |

* cited by examiner

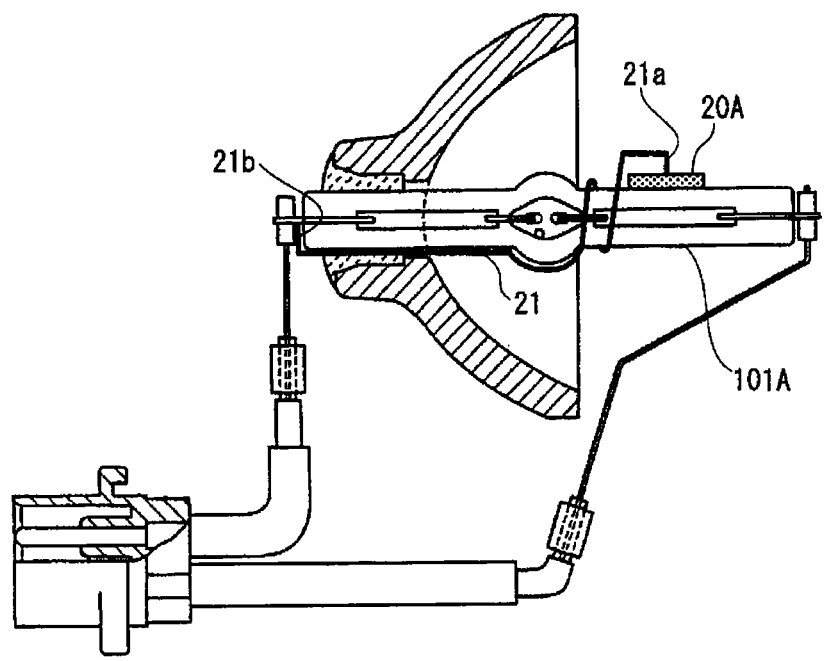

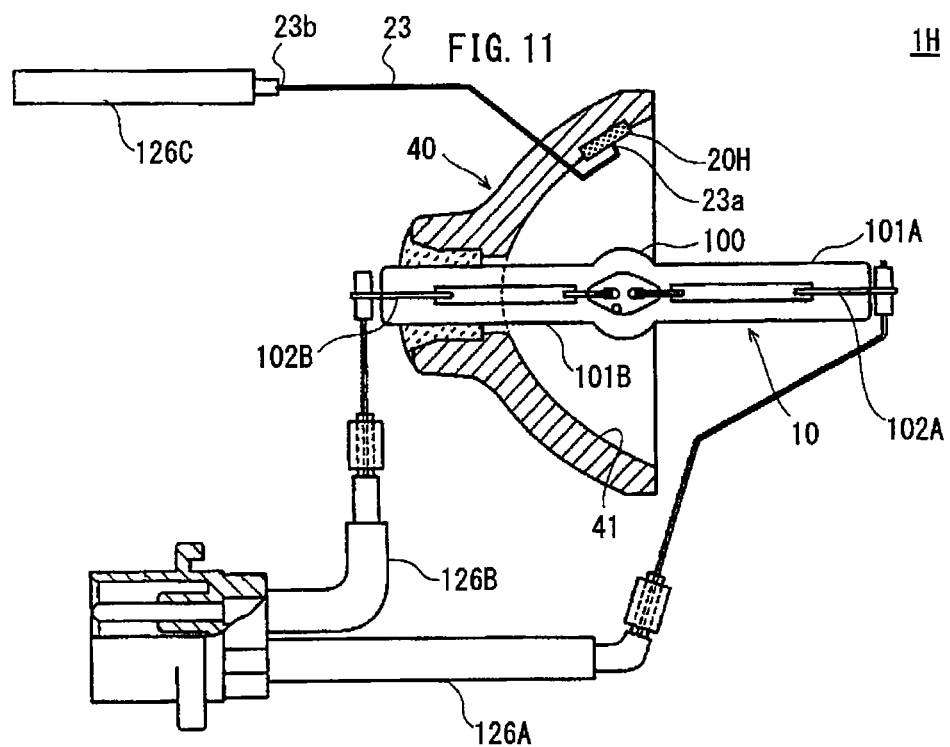

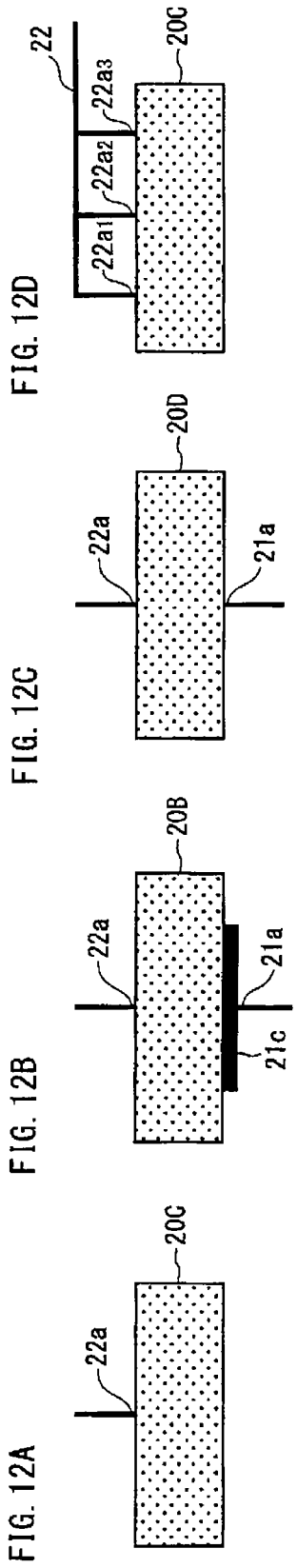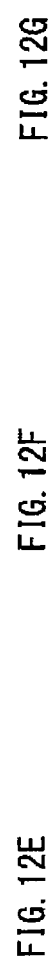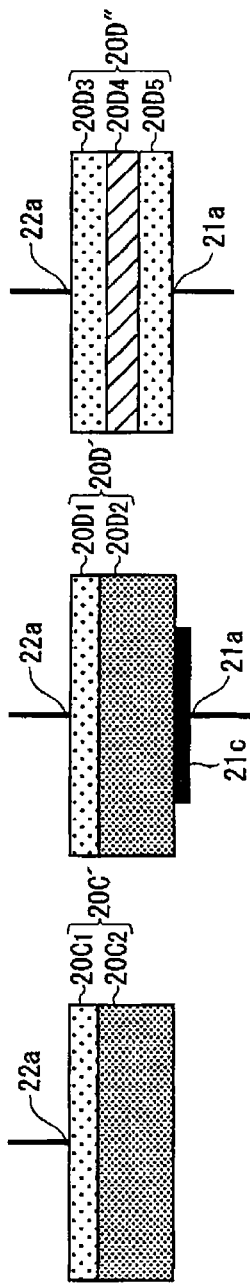

HIGH PRESSURE DISCHARGE LAMP WITH START-UP ASSIST MEMBER, LAMP UNIT, LAMP SYSTEM, AND PROJECTOR

RELATED APPLICATIONS

The present application claims priority from PCT/JP2011/003881 filed on Jul. 6, 2011 which in turn claims priority from Japanese Patent Application 2010-290895 filed on Dec. 27, 2010.

TECHNICAL FIELD

The present invention relates to a high pressure discharge lamp with a start-up assist member, a lamp unit, a lamp system, and a projector, and in particular to a technology for reducing breakdown voltage of the lamp.

BACKGROUND ART

In an image display apparatus such as a liquid crystal projector and a digital light processing (DLP) projector, a lamp system including a high pressure discharge lamp such as a metal halide lamp, a xenon lamp, and a high pressure mercury lamp is used.

A conventional high pressure discharge lamp includes an envelope made of fused quartz. The envelope includes a substantially spherical light-emitting part having a discharge space therein, and a pair of sealing parts that are connected to the light-emitting part. In each of the sealing parts, a discharge electrode and an external lead wire are disposed at either ends of a metal foil in a longitudinal direction of the metal foil. In the discharge space, particular discharge gas and mercury are enclosed and the discharge electrodes are disposed to face each other at a fixed interval. Upon lighting of the lamp, light is radiated by the emission of an arc discharge between the pair of discharge electrodes disposed to face each other. The external lead wires are disposed to be partly exposed outside of the sealing parts, and receive power supplied from an external lighting circuit.

The high pressure discharge lamp with the above structure is integrated with a reflector having a reflective surface so as to efficiently emit the light generated by the light-emitting part toward the front. The high pressure discharge lamp and the reflector are used as a lamp unit.

A high pressure discharge lamp has conventionally been demanded to reduce breakdown voltage thereof. In general, breakdown voltage of a high pressure discharge lamp is a high voltage of kV order, and a lighting circuit needs to generate a voltage larger than the breakdown voltage. Therefore, the circuit that generates the high voltage needs to use a large transformer, a highly voltage-resistant electronic part and the like. Also, it is necessary to give adequate consideration of insulation to components such as cables and connectors to which high voltage is applied and peripheral components thereof. Thus, high breakdown voltage of a high pressure discharge lamp is a great obstacle in reducing the size or cost of a lamp system including a lighting circuit. Therefore, reduction in breakdown voltage is demanded.

There has been a conventional approach to reduce breakdown voltage of a high pressure discharge lamp. According to this approach, as shown in the lamp 10X depicted in FIG. 22, an adjacent conductor 21X as a start-up assist member is provided on the outer surface of the lamp 10X in the vicinity of a light-emitting part 100 (For example, see Patent Literature 1). To be specific, the upstream end of the wire-like adjacent conductor 21X is connected to an exposed portion of the external lead wire 102A corresponding to either a sealing part 101A or a sealing part 101B (here, 101A). The adjacent conductor 21X is extended across the light-emitting part 100 toward the sealing part 101B that is opposite to the sealing part 101A so that the adjacent conductor 21X is close to or in contact with the outer surface of the light-emitting part 100 of the lamp 10X. The adjacent conductor 21X is wound around the outer surface of the lamp 10X in the vicinity of the border of the light-emitting part 100 and the sealing part 101B. Upon lighting of the lamp, by applying a voltage to the external lead wire 21X, an intense electric field occurs between the adjacent conductor 21X and the discharge electrode with the opposite polarity (the discharge electrode 104B in FIG. 22) before discharge occurs between the pair of discharge electrodes 104A and 104B in a discharge space 105. Such an intense electric field encourages electrons to emit from the discharge electrode 104B, which reduces breakdown voltage of the lamp 10X. However, even when the above adjacent conductor 21X is used, it is difficult to say that an effect of reducing breakdown voltage of the lamp 10X is adequately obtained.

Alternatively, another approach is to reduce breakdown voltage by enclosing radioactive gas (for example, Kr85) in a light-emitting part. This approach has an effect of adequately reducing breakdown voltage of a lamp. However, it is preferred that there are other approaches in consideration of environmental awareness that has risen in recent years.

In view of the above, in recent years, there has been proposed an approach to further improve an effect of start-up assistance by using a devised structure of an adjacent conductor wire (for example, see Patent Literature 2). Such an approach is to connect the upstream end of an adjacent conductor wire to one of the external lead wires, and put the downstream end of the adjacent conductor wire in contact with substantially only one point of the outer surface of the sealing part. The sealing part is made of fused quartz and encloses a metal foil with a polarity opposite a polarity of the one external lead wire. Upon lighting of the lamp, by applying a voltage to the external lead wires, a corona discharge occurs at the point where the downstream end of the adjacent conductor wire is in contact with the outer surface of the sealing part made of fused quartz before discharge occurs between the pair of discharge electrodes. In accordance with the corona discharge, ultraviolet (UV) occurs and the lamp is irradiated with the UV. Such UV radiation generates photoelectric effect on the surface of the discharge electrodes, and electrons (photoelectrons) are discharged. This encourages the lamp to start discharge. As a result, breakdown voltage is reduced.

CITATION LIST

[Patent Literature]
[Patent Literature 1]
WO 2004/090934
[Patent Literature 2]
Japanese Patent Application Publication No. 2009-181927
[Patent Literature 3]
Japanese Patent No. 3938038
[Patent Literature 4]
Japanese Patent Application Publication No. 2004-139955

SUMMARY OF INVENTION

Technical Problems

However, even the above adjacent conductor does not produce a sufficient effect compared to the above radioactive gas and does not adequately contribute to reduce the size or cost of the lamp system including a lighting circuit. Also, there are some restrictions, e.g., a position of an adjacent conductor is restricted. Therefore, such an approach is difficult to apply when there is a need to reduce the size of the lamp attempts to be reduced.

From a different viewpoint from the Patent Literature 2, there has been proposed an approach to encourage an intense electric field to occur by mixing metal or a metal compound in a sealing part and increasing relative permittivity in the sealing part (for example, see Patent Literature 3). However, it is still difficult to obtain an effect of efficiently reducing breakdown voltage. Also, according to a technology described in Patent Literature 3, gaps are provided between sealing parts and electrodes in an envelope in order to form an electric field. The problem is that a gap in a sealing part of a high pressure discharge lamp might lead to a break of the lamp originating from the sealing part due to high-pressure gas while the lamp is lighting. Therefore, it is very difficult to work out a design that realizes such a structure. Furthermore, in the first place, mixing metal or a metal compound in a sealing part leads to unreliability of pressure resistance of the sealing part, and accordingly, it is difficult to apply such an approach to a high pressure discharge lamp having high gas pressure.

There has been also proposed a structure according to which a supplementary discharge tube is provided close to a light-emitting part, and breakdown voltage is reduced with use of UV that occurs in accordance with light emission of the supplementary discharge tube (for example, see Patent Literature 4). However, this approach is also not effective. In addition, a new problem arises that a position of the discharge tube is restricted in configuring the lamp unit, for example.

Thus, a high pressure discharge lamp still has matters to be resolved in reducing breakdown voltage.

The present invention has been achieved in view of the above problems, and the first aim thereof is to provide a high pressure discharge lamp with a start-up assist member, a lamp unit, a lamp system, and a projector that adequately reduce breakdown voltage and have excellent productivity, compared to conventional art.

In addition to the above aim, the second aim thereof is to provide a high pressure discharge lamp with a start-up assist member, a lamp unit, a lamp system, and a projector that provide the high design flexibility due to reduced restriction on the position of an adjacent conductor.

Solution to Problem

In order to solve the above problem, the present invention is a lamp unit comprises: a high pressure discharge lamp that includes an envelope having a discharge space therein, and a pair of discharge electrodes exposed to the discharge space; a reflector that reflects light emitted from the high pressure discharge lamp; and a start-up assist member that assists the high pressure discharge lamp in starting up, wherein the envelope includes a light-emitting part enclosing the discharge space, and a first sealing part and a second sealing part that are connected to the light-emitting part, and the start-up assist member includes a first metal wire and a dielectric member, one end of the first metal wire being electrically connected to one of the discharge electrodes of the high pressure discharge lamp, and the other end of the first metal wire and the dielectric member being close to or in contact with each other so that discharge occurs therebetween when a voltage is applied to cause the high pressure discharge lamp to start discharging, the dielectric member having relative permittivity higher than relative permittivity of the envelope.

Note that the expression "close to or in contact with the dielectric member so that discharge occurs therebetween when a voltage is applied to cause the high pressure discharge lamp to start discharging" means that "close to the dielectric member so that discharge occurs therebetween when a voltage is applied to cause the high pressure discharge lamp to start discharging, or in contact with the dielectric member so that discharge occurs therebetween when a voltage is applied to cause the high pressure discharge lamp to start discharging".

Here, the first sealing part and the second sealing part each may enclose a metal foil, from one end of each metal foil, a corresponding discharge electrode may extend into the discharge space, from the other end of each metal foil, an external lead wire may extend so as to be partly exposed outside a corresponding sealing part, the dielectric member may be located on an outer surface of one of the first sealing part and the second sealing part, and the one end of the first metal wire may be electrically connected to an exposed portion of the external lead wire corresponding to the other one of the first sealing part and the second sealing part.

Also, the high pressure discharge lamp may be provided with a subreflector that reflects, toward the reflector, the light emitted from the light-emitting part.

Also, the first sealing part and the second sealing part each may enclose a metal foil, from one end of each metal foil, a corresponding discharge electrode may extend into the light-emitting part, from the other end of each metal foil, an external lead wire may extend so as to be partly exposed outside a corresponding one of the first sealing part and the second sealing part, the dielectric member may be located on a reflective surface of the reflector, and the one end of the first metal wire may be electrically connected to an exposed portion of the external lead wire corresponding to one of the first sealing part and the second sealing part.

Furthermore, the first sealing part and the second sealing part each may enclose a metal foil, from one end of each metal foil, a corresponding discharge electrode may extend into the light-emitting part, from the other end of each metal foil, an external lead wire may extend so as to be partly exposed outside a corresponding sealing part, the high pressure discharge lamp may be provided with a subreflector that reflects, toward the reflector, the light emitted from the light-emitting part, and the dielectric member may be located on a surface of the subreflector.

Also, the dielectric member may be a reflective film of the reflector.

Also, the high pressure discharge lamp may be provided with a subreflector that reflects, toward the reflector, the light emitted from the light-emitting part, and the dielectric member may be a reflective film of the subreflector.

Also, the first sealing part and the second sealing part each may have a shape of a cylinder, an elliptic cylinder, or a flat plate, and the dielectric member may be ring-shaped and fit onto the outer surface of the one of the first sealing part and the second sealing part. In this case, an outer diameter of the dielectric member may be equal to or less than a largest outer diameter of the light-emitting part.

Alternatively, the dielectric member may have a shape of a rectangular parallelepiped.

Also, the envelope may be made of fused quartz.

The dielectric member may contain a titanium compound. In this case, it is preferable that the titanium compound is at least one selected from the group consisting of titanium dioxide, barium titanate, and strontium titanate.

An end of the first metal wire or a part of a side surface of the first metal wire may be resiliently biased so as to be close to or in contact with the dielectric member.

Also, the first metal wire may be wound around the high pressure discharge lamp.

Also, the other of the external lead wires may be connected to a second metal wire, the other external lead wire having a polarity opposite a polarity of the one external lead wire connected to the first metal wire, and the dielectric member may be close to or in contact with the second metal wire.

Furthermore, the present invention is a high pressure discharge lamp with a start-up assist member comprising: a high pressure discharge lamp that includes an envelope having a discharge space therein, and a pair of discharge electrodes exposed to the discharge space; and a start-up assist member that assists the high pressure discharge lamp in starting up, wherein the envelope includes a light-emitting part enclosing the discharge space, and a first sealing part and a second sealing part that are connected to the light-emitting part, and the start-up assist member includes a first metal wire and a dielectric member, one end of the first metal wire being electrically connected to one of the discharge electrodes of the high pressure discharge lamp, and the other end of the first metal wire and the dielectric member being close to or in contact with each other so that discharge occurs therebetween when a voltage is applied to cause the high pressure discharge lamp to start discharging, the dielectric member having relative permittivity higher than relative permittivity of the envelope.

Also, the present invention is a lamp system according to which a lighting circuit is electrically connected to any high pressure discharge lamp with the start-up assist member described above.

Also, the present invention is a projector provided with the above lamp system.

Advantageous Effects of Invention

The lamp unit of the present invention having the above structure is provided with a first metal wire and a UV generating device as a start-up assist member. One end of the first metal wire is electrically connected to one of discharge electrodes of a high pressure discharge lamp. The UV generating device is composed of a dielectric member having relative permittivity higher than that of an envelope. Here, the first metal wire and the other one of the discharge electrodes are disposed to face each other. The first metal wire is provided via a dielectric member. The other discharge electrode has a polarity opposite a polarity of the first metal wire. The other end of the first metal wire is located close to or in contact with the dielectric member so that discharge occurs therebetween when a voltage is applied to cause the high pressure discharge lamp to start discharging.

Accordingly, when a voltage is applied to light the high pressure discharge lamp, a voltage is first applied between the electrodes facing each other, and at the same time, a corona discharge occurs between the dielectric member and the first metal wire that are close to each other or in the vicinity of a position at which the dielectric member and the first metal wire are in contact with each other. In accordance with the discharge, UV occurs and the lamp is irradiated with the UV. Here, the lamp unit of the present invention can cause UV to occur when a low voltage is applied since the lamp unit uses the dielectric member having relative permittivity higher than that of the envelope as the dielectric member. Such UV radiation generates photoelectric effect on the surface of the discharge electrode, and electrons (photoelectrons) are discharged. This causes the lamp to start discharging even when a considerably low voltage is applied compared to conventional art. Accordingly, the present invention can reduce voltage generated by the lighting circuit as well as breakdown voltage of the lamp, and accordingly, can be expected to reduce the size or cost of the lamp system including the lighting circuit. Also, unlike the technology of Patent Literature 3, the present invention does not need to provide gaps between the sealing parts and the electrodes in the envelope or to mix a metal compound in the sealing part. This ensures reliability of pressure resistance of the sealing part. Furthermore, since radioactive gas does not need to be used, environmental awareness that has risen in recent years is also taken into consideration.

Also, the lamp unit of the present invention with the above structure may have the dielectric member not only on the lamp but also on a reflective surface of a reflector. In this case, when a voltage is applied, a corona discharge occurs between the dielectric member and the metal wire that are close to each other or in the vicinity of a position at which the dielectric member and the metal wire are in contact with each other. In accordance with the corona discharge, UV occurs in the same manner as in the case of the lamp described above. Photoelectrons generated in accordance with such UV radiation reduce breakdown voltage in the light-emitting part, and as a result, the lamp relatively easily starts discharging. Therefore, improvement of luminous efficiency can be expected.

In this way, the lamp unit of the present invention has the high design flexibility in the arrangement of the start-up assist member. In addition, since the start-up assist member is provided, even a small lamp unit can appropriately reduce the breakdown voltage without reducing luminous efficiency.

BRIEF DESCRIPTION OF DRAWINGS

FIG. 4 is a partial cross-sectional view showing a structure of a lamp unit 1A pertaining to Embodiment 2.

FIG. 11 is a partial cross-sectional view showing a structure of a lamp unit 1H pertaining to Embodiment 9.

FIG. 12A is an enlarged cross-sectional diagram showing a structure of the principal parts of a dielectric member and a metal wire of Embodiment 1. FIG. 12B is an enlarged cross-sectional diagram showing a structure of the principal parts of a dielectric member and a metal wire of Embodiment 2. FIG. 12C is an enlarged cross-sectional diagram showing a structure of the principal parts of the dielectric member and the metal wire in FIG. 12B when a pad is not provided. FIG. 12D is an enlarged cross-sectional diagram showing a structure of the principal parts of the dielectric member and the metal wire when the metal wire has a plurality of edges. FIG. 12E is an enlarged cross-sectional diagram showing a structure of the principal parts of the dielectric member and the metal wire when the dielectric member has a two-layered structure. FIG. 12F is an enlarged cross-sectional diagram showing a structure of the principal parts of the dielectric member and the metal wire in FIG. 12B when the dielectric member has a two-layered structure. FIG. 12G is an enlarged cross-sectional diagram showing a structure of the principal parts of the dielectric member and the metal wire when the dielectric member has a three-layer structure.

DESCRIPTION OF EMBODIMENTS

A lamp unit and a lamp system pertaining to each Embodiment of the present invention are described below with reference to the drawings.

Note that members shown in each drawing are not drawn to scale. In addition, in the present invention, the character "-" in numerical ranges indicates that the values on both sides are included in the range.

Embodiment 1

Figure 1:
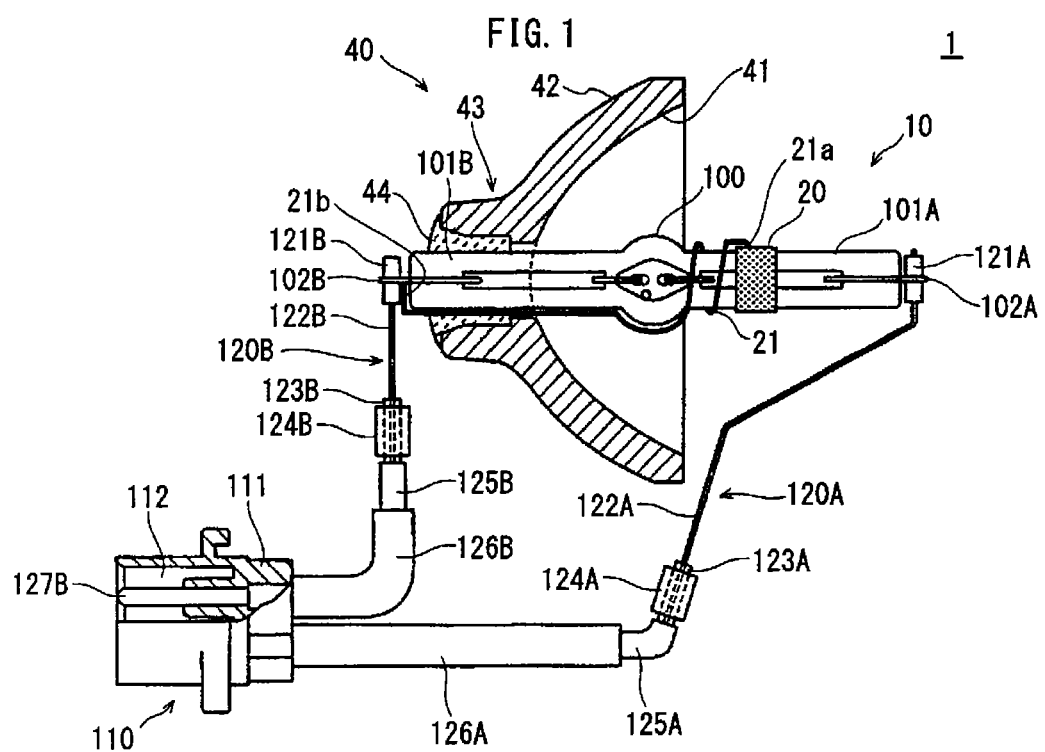
FIG. 1 is a partial cross-sectional view showing a structure of a lamp unit 1 pertaining to Embodiment 1.

FIG. 1 is a partial cross-sectional view showing a structure of a lamp unit 1 pertaining to Embodiment 1, used for a projector. In FIG. 1, only a reflector 40 and a part of a connector 110 are shown in section for the sake of explanation.

As shown in FIG. 1, the lamp unit 1 includes mainly a high pressure discharge lamp 10, the reflector 40, a pair of lead wires 120A and 120B, and the connector 110.

(Structure of Lamp 10)

Figure 2:
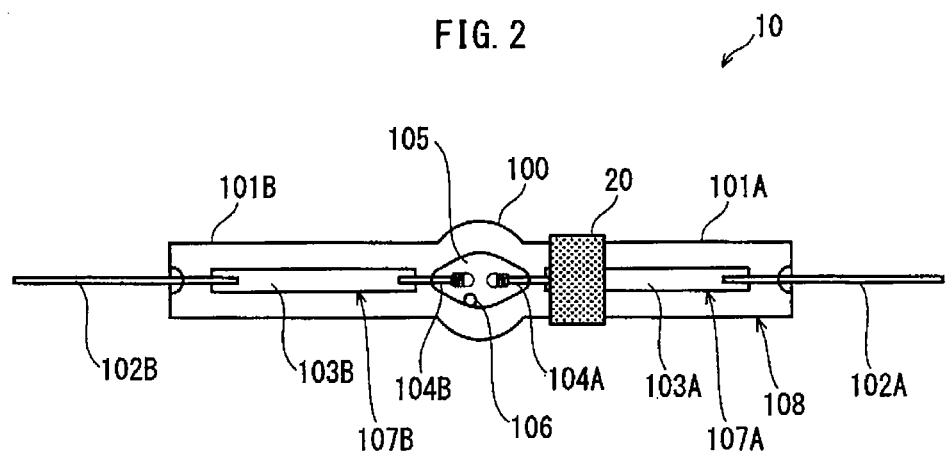
FIG. 2 is a front view showing a structure of a lamp 10.

FIG. 2 is a front view showing a structure of the lamp 10. In FIG. 2, the inside of the lamp 10 is also shown with a solid line for the sake of explanation.

The high pressure discharge lamp 10 includes a discharge container (envelope) 108 made of fused quartz, for example. The discharge container 108 is composed of a pair of sealing parts 101A and 101B and a light-emitting part 100 that are integrated as one piece. The pair of sealing parts extend from opposite sides of the light-emitting part 100 and are substantially cylindrical, for example. The sealing part 101A has a ring-shaped dielectric member 20 fit onto the outer surface of the sealing part 101A.

The light-emitting part 100 has a discharge space 105 therein. The discharge space 105 contains materials such as mercury as a light-emitting material, rare gas as discharge gas used upon lighting of the lamp, and halogen material. In the case of a high pressure mercury lamp used for a projector, mercury is contained in a range of 0.15-0.40 mg/mm$^3$ in the discharge container 108, and as an example, at 0.30 mg/mm$^3$. In addition, one of argon (Ar), krypton (Kr), and xenon (Xe), or mixed gas of at least two of the above is enclosed as rare gas. The enclosed pressure is in a range of 0.01-1 MPa, for example, when measured at room temperature while the lamp is off. As an example, argon is enclosed at 0.03 MPa (25° C.). As halogen material, one of iodine (I), bromine (Br), and chlorine (Cl) or mixture of at least two of the above per unit of volume of the arc tube is enclosed in a range of $1 \times 10^{-6}$-$1 \times 10^{-2}$ μmol/mm$^3$. As an example, bromine is enclosed at $5 \times 10^{-4}$ μmol/mm$^3$.

Regarding the pair of sealing parts 101A and 101B, only one of the pair (hereinafter, referred to as a second sealing part 101B) is attached to the reflector 40, and the other of the pair (hereinafter, referred to as a first sealing part 101A) is not attached to any member.

The second sealing part 101B and the first sealing part 101A enclose an electrode assembly 107A and an electrode assembly 107B, respectively.

The electrode assemblies 107A and 107B respectively consist of metal foils 103A and 103B, discharge electrodes 104A and 104B, and external lead wires 102A and 102B. The discharge electrodes 104A and 104B respectively extends from one end of the metal foil 103A and one end of the metal foil 103B in a longitudinal direction thereof, and the external lead wires 102A and 102B respectively extends from the other end of the metal foil 103A and the other end of the metal foil 103B in the same direction. The metal foils 103A and 103B are respectively connected to the discharge electrodes 104A and 104B and the external lead wires 102A and 102B by welding, for example. In the sealing parts 101A and 101B, the metal foils 103A and 103B are enclosed near the centers of the sealing parts 101A and 101B, respectively, and the discharge electrodes 104A and 104B are located so as to project into the discharge space 105 in the light-emitting part 100. The external lead wires 102A and 102B are located so as to project outward from the sealing parts 101A and 101B, respectively.

The discharge electrodes 104A and 104B are disposed to face each other and made of tungsten (W) material, for example. The discharge electrodes 104A and 104B are aligned in substantially a straight line so that tip portions thereof are exposed to the discharge space 105 of the discharge container 108. The ends of the discharge electrodes 104A and 104B opposite the tip portions thereof are embedded inside the sealing parts 101A and 101B, respectively. An inter-electrode distance (discharge gap), which is a distance between the tip portions, can be set to any value. In the case of the short arc type, the distance can be set in a range of 0.5-2.0 mm, for example.

The metal foils 103A and 103B are made of molybdenum (Mo) material, for example.

The external lead wires 102A and 102B are made of molybdenum material or tungsten material, for example, and each have a rod shape that is approximately 0.4 mm in diameter. Portions of the external lead wires 102A and 102B close to the metal foils 103A and 103B are embedded within the sealing parts 101A and 101B, respectively. Portions of the external lead wires 102A and 102B not close to or connected to the metal foils 103A and 103B project outward from the sealing parts 101A and 101B, respectively. Here, though the diameter of each of the external lead wires 102A and 102B is not limited to approximately 0.4 mm, it is preferred to have the diameter equal to or less than 0.5 mm in order to increase airtightness of the sealing parts 101A and 101B.

Note that the second sealing part 101B may have a metal cap that covers the end of the second sealing part 101B to prevent UV emitted from the light-emitting part 100 from passing through the second sealing part 101B and leaking outside.

Returning to FIG. 1, a part of the first metal wire (metal wire 21) is wound around the outer surface of the first sealing part 101A. The metal wire 21 is made of iron-chromium (Fe—Cr) alloy or molybdenum material, for example. Along with the dielectric member 20 described later, the metal wire 21 constitutes a start-up assist member for reducing breakdown voltage upon lighting of the lamp, and acts as a UV generating device, as described later. To be specific, one end (upstream end 21b) of the metal wire 21 is electrically connected to the external lead wire 102B that extends outside from the second sealing part 101B, and accordingly the metal wire 21 is electrically connected to the discharge electrode 104B, indirectly. The metal wire 21 is further stretched along the outer circumferential surface of the lamp 10 toward the first sealing part 101A and wound around the outer surface of the first sealing part 101A a few times so that the other end (downstream end 21a) of the metal wire 21 is in point contact with an upper surface of the dielectric member 20 placed at a position corresponding to the metal foil 103A. That is, the downstream end 21a of the metal wire 21 and the dielectric member are in contact with each other so that discharge occurs therebetween when a voltage is applied to cause the high pressure discharge lamp to start discharging. At that time, a tip of the downstream end 21a or a part of the side surface of the downstream end 21a is stuck into the upper surface (opposite the surface facing the first sealing part 101A) of the dielectric member 20 with resilient biasing force (in FIG. 1, the tip is stuck approximately at a right angle). As the metal wire 21 and the upper surface are in contact with each other at a smaller area, concentration of the electric field increases, and as a result, a corona discharge and UV that is to occur in accordance with the corona discharge are likely to sufficiently occur. Note that the term "point contact" here is not limited to a mathematical definition, and refers to contact in which the metal wire 21 and the dielectric member 20 are in contact with each other at a severely reduced area.

Note that the other end of the metal wire 21 is not limited to the downstream end 21a, and any portion of the metal wire 21 close to the downstream end thereof may be used.

Though the metal wire 21 may not necessarily have to be wound around the first sealing part 101A, it is preferable to wind the metal wire 21 since the metal wire 21 becomes structurally stable, and in addition, the wound metal wire 21 encourages an intense electric field to occur in the vicinity of the light-emitting part 100, which is expected to reduce the breakdown voltage.

The dielectric member 20 is a main feature of the lamp unit 1. The dielectric member 20 has relative permittivity higher than that of the structural material of the envelope 108 (fused quartz) of the high pressure discharge lamp 10. Also, the dielectric member 20 is made of a heat-resistant material with sufficiently high resistance to heat that is generated while the high pressure discharge lamp is lighted, e.g., a baked ceramic material produced by heating a metal compound at high temperatures. To be specific, relative permittivity of fused quartz (high purity $SiO_2$) is approximately 3.5-4.0, and accordingly, any material that has relative permittivity higher than the upper limit of the relative permittivity of the fused quartz may be provided. To be specific, it is preferable to use one or more titanium compounds (titanium oxide and the like) selected from the group consisting of barium titanate ($BaTiO_3$, relative permittivity of approximately 1200), strontium titanate ($SrTiO_3$, relative permittivity of approximately 300), and titanium dioxide ($TiO_2$, relative permittivity of approximately 100). In particular, barium titanate and strontium titanate are preferable since relative permittivity thereof is extremely high as compared to that of fused quartz. Note that the ceramic material is not limited to a baked material. For example, pasty ceramic material may be applied.

Figure 3A:
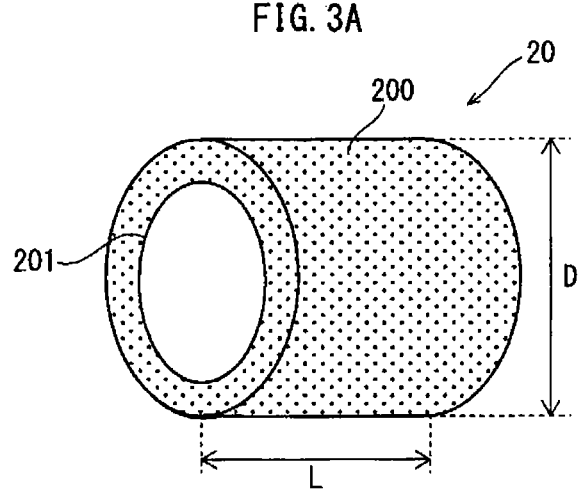
FIG. 3A is a perspective diagram showing a structure of a dielectric member.
Figure 3B:
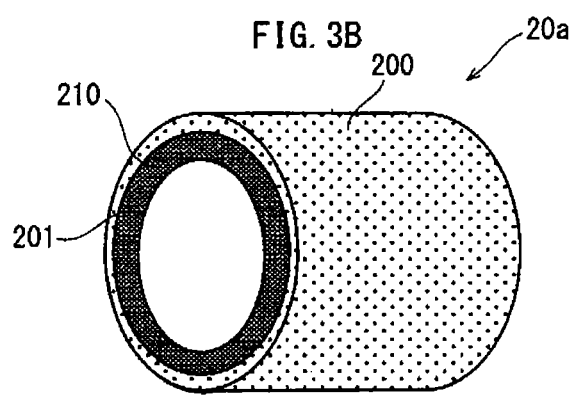
FIG. 3B is a perspective view of a two-layered dielectric member.

The dielectric member 20 is ring-shaped in appearance, as shown in a perspective view of FIG. 3A. Note that a structure of the dielectric member 20 is not limited to a single-material structure, and as shown in FIG. 3B, a multi-layered structure (in FIG. 3B, two-layered structure) may be provided. In FIG. 3B, a first layer 200 having an opening 201 and a second layer 210 are layered. The second layer 210 is made of a material different from the first layer 200. Here, the first layer 200 is made of a ceramic material having high relative permittivity. A material that constitutes the second layer 210 is not limited to the ceramic material, and may be fused quartz, alumina, metal and the like.

The dielectric member 20 has an outer diameter D (see FIG. 3A) whose length is ideally short enough not to block light emitted from the light-emitting part 100. It should be noted in particular that the dielectric member 20 should not block light that is emitted from the light-emitting part 100 and reflected by the reflector 40 so as to be emitted toward the front. Accordingly, when assuming a virtual line connecting a portion of the light-emitting part 100 having the largest outer diameter and the end of the first sealing part 101A (or the second sealing part 101B), it is most preferable that the dielectric member 20 does not traverse the virtual line. Alternatively, the outer diameter D is preferred to be equal to or smaller than the largest outer diameter of the light-emitting part 100. However, the length of the outer diameter D is not necessarily limited to the above, and if the degree is small enough, the outer diameter D may be equal to or larger than the largest outer diameter of the light-emitting part 100.

The length L of the dielectric member 20 is preferred to be long. This is because as the surface area of the dielectric member 20 increases, more adequate charge is stored in the vicinity of the outer surface of the dielectric member 20 when a voltage is applied, and accordingly it is expected that a corona discharge increases. However, it should be noted that the dielectric member should not block light emitted from the light-emitting part 100.

The dielectric member 20 can be fixed to the first sealing part 101A with use of an adhesive agent such as excellent heat-resistant cement having a low thermal expansion coefficient.

(Other Components of Lamp 10)

The reflector 40 is a dichroic reflector, for example, and includes a bowl-shaped part 42 and a tube part 43. The bowl-shaped part 42 is provided with a concave reflective surface 41 that selectively reflects only specific wavelengths of light included in light generated by the light-emitting part 100 toward the front. The tube part 43 is positioned at the back of the bowl-shaped part 42. The second sealing part 101B of the high pressure discharge lamp 10 and the metal wire 21 are inserted into the tube part 43 from the front of the reflective surface 41 of the bowl-shaped part 42 so that the focus of the reflective surface 41 and the center between the pair of discharge electrodes 104A and 104B of the high pressure discharge lamp 10 substantially coincide with each other. The second sealing part 101B and the tube part 43 adhere to each other by filling a gap therebetween with use of cement as an adhesive agent 44. Note that the adhesive agent 44 is not limited to cement, and it is possible to use a commercially available heat-resistant adhesive agent for a lamp.

Returning to FIG. 1, the lead wires 120A and 120B are respectively composed of coated conducting wires 126A and 126B, nickel wires 122A and 122B, and connecting members 124A and 124B that connect the above two wires. At the ends of the lead wires 120A and 120B made of the nickel wires 122A and 122B, sleeves 121A and 121B are attached as connection terminals, respectively. At the ends of the lead wires 120A and 120B made of the coated conducting wires 126A and 126B, a connector 110 used for external connection is attached. The connector 110 is made of resin and contains connection terminals 127A and 127B (127A is unillustrated) in the inner space thereof. Note that the lead wires 120A and 120B are not limited to the above structure, and may be single wires, other than joint wires. In addition, the connection terminals are not limited to the sleeves 121A and 121B, and any conducive members may be provided.

The lead wires 120A and 120B are electrically connected to the external lead wires 102A and 102B of the electrode assemblies 107A and 107B of the high pressure discharge lamp 10 via the sleeves 121A and 121B, respectively.

The coated conducting wires 126A and 126B are formed by coating conductive core members 123A and 123B with insulative coating members 125A and 125B, respectively. The core members 123A and 123B and the nickel wires 122A and 122B are connected by the connecting members 124A and 124B, respectively. Note that, the nickel wires 122A and 122B are not limited to pure nickel wires, and may be made of nickel alloy such as a copper-nickel (Cu—Ni) alloy.

The sleeves 121A and 121B are connecting terminals for improving the joining strength between the external lead wires 102A and 102B and the lead wires 120A and 120B, respectively. The sleeves 121A and 121B are attached to the lead wires 120A and 120B by fitting iron-nickel (Fe—Ni) alloy that is tubular onto the nickel wires 122A and 122B, respectively, and crimping the alloy. Note that a material that constitutes the sleeves 121A and 121B is not limited to the iron-nickel alloy, but is preferably a material that fits in with the external lead wires 102A and 102B.

The sleeves 121A and 121B are fixed to the external lead wires 102A and 102B, respectively, by welding, for example. To be specific, the sleeves 121A and 121B are respectively welded to the external lead wires 102A and 102B so as to be perpendicular to the external lead wires 102A and 102B, and bent in an elbow-shape so as to hold the external lead wires 102A and 102B, respectively. Thus, by bending the sleeves 121A and 121B in the elbow-shape, it is possible to increase an area in which the sleeves 121A and 121B and the external lead wires 102A and 102B are in contact with each other, respectively, and as a result, the joining strength increases.

Note that the sleeves 121A and 121B and the external lead wires 102A and 102B may be respectively fixed to each other by methods such as thread fastening, crimping, and pressing, other than welding. However, welding is more preferable since joining strength is large.

(Effect of Dielectric Member 20)

According to the lamp unit 1 of Embodiment 1 with the above structure, when the lamp is caused to start discharging, a high-frequency voltage of approximately several hundred-100 kHz is firstly applied to the lamp 10 and the metal wire 21 of the lamp 10 from an external source. Here, the downstream end 21a of the metal wire 21 is located close to (in the lamp unit 1, in contact with) the dielectric member 20 so that discharge occurs. Accordingly, when a voltage is applied, an intense electric field occurs between the downstream end 21a of the metal wire 21 and the outer surface of the dielectric member 20 that are close to each other or at a position at which the downstream end 21a of the metal wire 21 and the outer surface of the dielectric member 20 are in contact with each other, and then a corona discharge (electron emission) occurs. In accordance with the corona discharge, UV occurs. The UV radiation generates photoelectric effect on the surface of the pair of discharge electrodes 104A and 104B in the light-emitting part 100, which discharges electrons (photoelectrons).

According to the above, the lamp 10 promotes dielectric breakdown of rare gas between the pair of discharge electrodes 104A and 104B, and accordingly spark discharge occurs when a relatively low voltage is applied. The spark discharge that has once occurred between the discharge electrodes 104A and 104B changes to arc discharge. In accordance with evaporation of mercury, mercury-vapor lighting of the lamp 10 with excellent luminous efficiency is realized.

Here, the dielectric member 20 is made of a material with relative permittivity much higher than relative permittivity of fused quartz (for example, a titanium compound), and accordingly electrification charge is abundantly stored on the surface of the dielectric member 20. This generates a corona discharge and UV that occurs in accordance with the corona discharge between the downstream end 21a of the metal wire 21 and the dielectric member 20 when a considerably low voltage is applied compared to conventional technology.

In addition, by providing the dielectric member 20 having high relative permittivity between the downstream end 21a of the metal wire 21 and the metal foil 103A and the discharge electrode 104A that are provided in the sealing part 101A, an electric field increases between the metal wire 21 and the dielectric member 20 that are close to each other or at a position at which the metal wire 21 and the dielectric member 20 are in contact with each other. This can abundantly generate UV.

The inventors of the present invention conducted an experiment with a high pressure discharge lamp using a conventional adjacent conductor wire. In the case where a voltage of approximately 1.5-2.0 kV was applied to start the lamp, a corona discharge occurred in the vicinity of the downstream end of the wire that acted as a trigger, and in the case where voltage of approximately 3 kV was applied, light emission in the light-emitting part was confirmed. In contrast, according to the structure of Embodiment 1, in the case where a voltage of approximately 300-800 V was applied, a corona discharge occurred, and in the case where a voltage equal to or less than 1.5 kV was applied, lighting in the light-emitting part was confirmed. This is adequately low breakdown voltage in the same way as when radioactive gas is used as a start-up assistance, as described above.

With such an effect, due to both of reduced breakdown voltage and excellent start-up performance, the lamp unit 1 realizes reduction of a voltage generated by the lighting circuit. Also, this can be expected to reduce the size or cost of a lamp system including a lighting circuit.

Furthermore, unlike the technology discussed in Patent Literature 2, the lamp unit 1 does not mainly use an intense electric field, but uses UV radiation to reduce breakdown voltage of the lamp 10. Accordingly, in the envelope 108, small gaps are not required between the sealing parts 101A and 101B and the electrode assemblies 107A and 107B, respectively, which makes it possible to avoid management of the degree of accuracy of the gaps. This enables the lamp unit 1 to be easily produced.

(Experiments to Assess Efficiency)

Figure 19A:
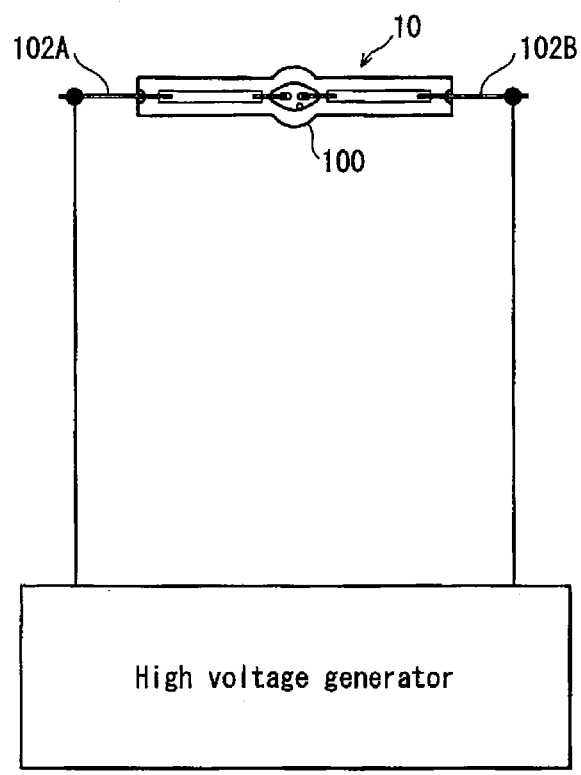
FIG. 19A is a conceptual diagram showing a structure of connection between a lamp and a high-voltage generator used in a start-up experiment.
Figure 19B:
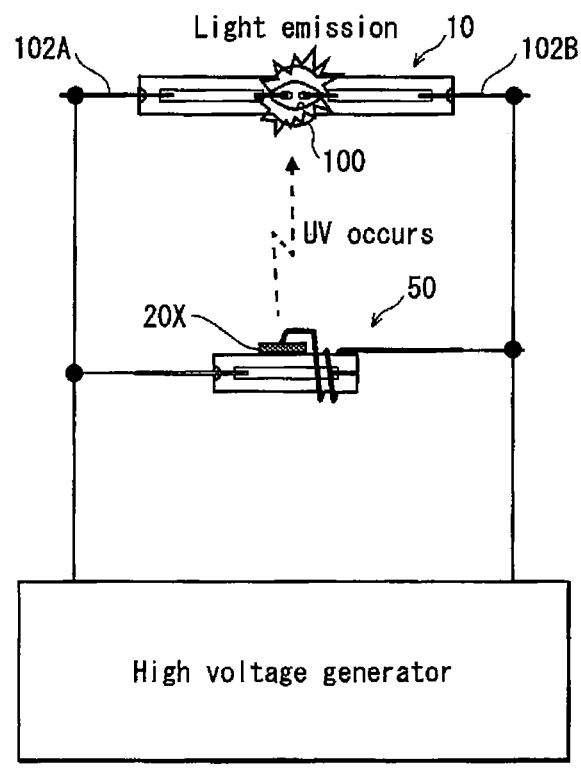
FIG. 19B explains a start-up experiment using the dielectric member of the present invention.
Figure 20A:
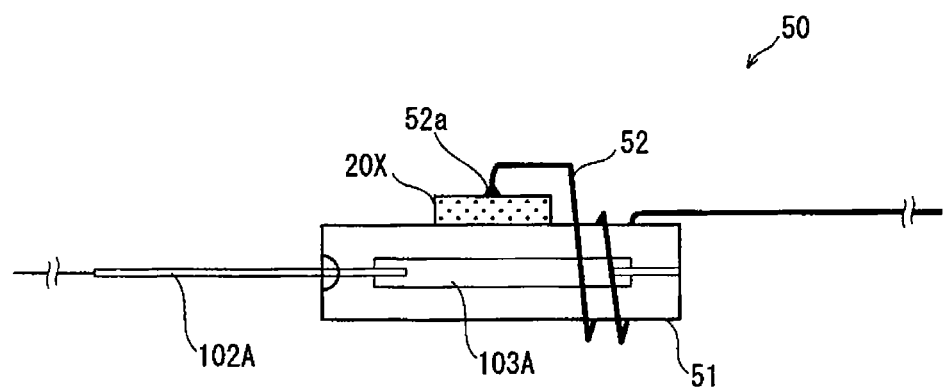
FIG. 20A is an enlarged conceptual diagram of the principal parts of FIG. 19B.

FIGS. 19A-19B and FIGS. 20A-20B are schematic views showing experiments to assess efficiency pertaining to start-up performance (lighting experiments), which was conducted by the inventors of the present invention. The inventors of the present invention observed start-up performance of the lamp 10 by configuring an experimental trigger member 50 using materials with sufficiently high relative permittivity. As shown in FIG. 19A, the basis of the experiments is a circuit in which an AC high voltage generator was connected to the external lead wires 102A and 102B of the lamp 10. As shown in FIG. 19B, the lamp 10 and the trigger member 50 were connected to the circuit in series. The trigger member 50 was composed of a sealing part 51, the metal foil 103A, the external lead wire 102A, and a dielectric member 20X, as shown in FIG. 20A. The sealing part 51 simulated the sealing parts 101A and 101B of the lamp 10. The metal foil 103A and the external lead wire 102A were enclosed in the sealing part 51. The dielectric member 20X was located outside the sealing part 51. The external lead wire 102A and a metal wire 52 were connected to the AC high voltage generator. Note that here, current output from the AC high voltage generator was restricted so that spark discharge was maintained but did not change to arc discharge (i.e., current was approximately equal to or less than 10 mA), for convenience.

Figure 20B:
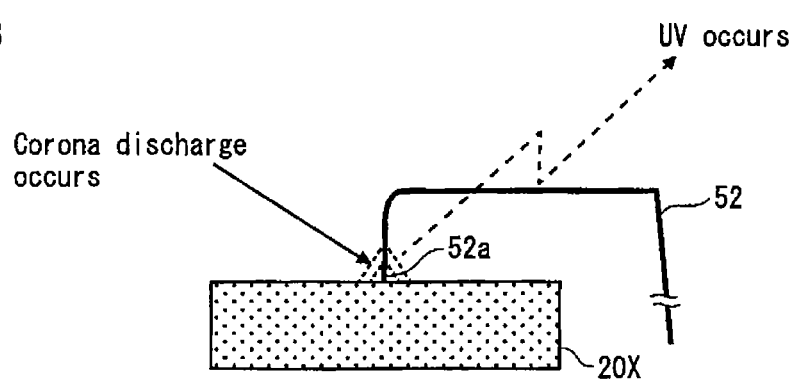
FIG. 20B is a further enlarged conceptual diagram of the principal parts of FIG. 20A.

The sinusoidal AC voltage of 10 kHz frequency was applied to the circuit while increasing. When the value of the voltage (peak value) increased to approximately 300-800 V, a corona discharge occurred in the vicinity of a point at which the downstream end 52a of the metal wire 52 and the dielectric member 20X were in contact with each other, and UV occurred in accordance with the corona discharge (FIG. 20B). When the value of the voltage further increased, the corona discharge expanded around the point and UV also increased. The inside of the light-emitting part 100 of the lamp 10 was irradiated with the UV, and when the applied voltage was equal to or less than 1.5 kV, spark discharge of the lamp 10 was confirmed to occur (discharge was confirmed to start) (FIG. 19B). Note that it is indicated that, when spark discharge of the lamp 10 occurs, a discharge path is formed within the light-emitting part, and accordingly, when the lighting circuit supplies predetermined power to the lamp 10, the spark discharge changes to arc discharge. Note that in an additional experiment, when the frequency of the AC high voltage generator was changed in the range of 500 Hz to 200 kHz, even though there was a slight difference, substantially the same effect as when the frequency was 10 kHz was obtained.

Thus, the high pressure discharge lamp of the present invention can generate a corona discharge and UV at the point on the dielectric member where a voltage is applied even when a low voltage equal to or less than approximately 800 V is applied, and cause the lamp to start discharging when a voltage equal to or less than 1.5 kV is applied. Furthermore, the main characteristic of the present invention is to cause the high pressure discharge lamp to start at a sufficiently low applied voltage even when the start-up assist member (metal wire and dielectric member) is located approximately 10 cm away from the high pressure discharge lamp. Here, the present invention is characterized in that the dielectric member acts as not an electric field regulation unit for generating an intense electric field but a unit that causes UV to occur in accordance with a corona discharge, and such a UV radiation effect encourages the light-emitting part to start. Accordingly, the trigger member and the high pressure discharge lamp can be located away from each other, as long as UV occurs in accordance with a corona discharge between the dielectric member and the metal wire that are close to each other and the UV that exceeds a certain amount can reach the light-emitting part. Therefore, in the high pressure discharge lamp of the present invention, restriction on a position of the dielectric member is reduced, and accordingly, the extremely high design flexibility can be achieved, as other embodiments described later. For example, the dielectric member can be located in the reflector.

In addition, according to the high pressure discharge lamp 10 of Embodiment 1, the dielectric member 20 is disposed between the metal wire 21 and the first sealing part 101A. Accordingly, a distance between the metal wire 21 and the electrode assembly 107A is relatively large, the electrode assembly 107A facing the metal wire 21 and being disposed in the first sealing part 101A. However, as described above, the present invention is to reduce breakdown voltage using UV occurring between the metal wire 21 and the dielectric member 20 that are close to each other or in the vicinity of a point at which the metal wire 21 and the dielectric member 20 are in contact with each other. Accordingly, increase of the distance does not matter much. This is the large feature of the present invention not included in conventional structure (Patent Literatures 1 and 2, for example) according to which the metal wire is located close to the sealing part as much as possible so that an intense electric field occurs around the metal wire.

The following are descriptions of other embodiments of the present invention, focusing on the difference with Embodiment 1.

Embodiments 2 and 3

FIG. 4 is a partial cross-sectional view showing a structure of a lamp unit 1A pertaining to Embodiment 2. Embodiment 2 differs from Embodiment 1 in that a rectangular parallelepiped dielectric member 20A is provided on the first sealing part 101A and the downstream end 21a of the metal wire 21 is in point contact with the upper surface of the dielectric member 20A. The dielectric member 20A is fixed on the first sealing part 101A with use of an adhesive agent such as cement.

The lamp unit 1A can be also expected to have the same effect as the lamp unit 1 of Embodiment 1 when the lamp 1A starts.

Figure 5:
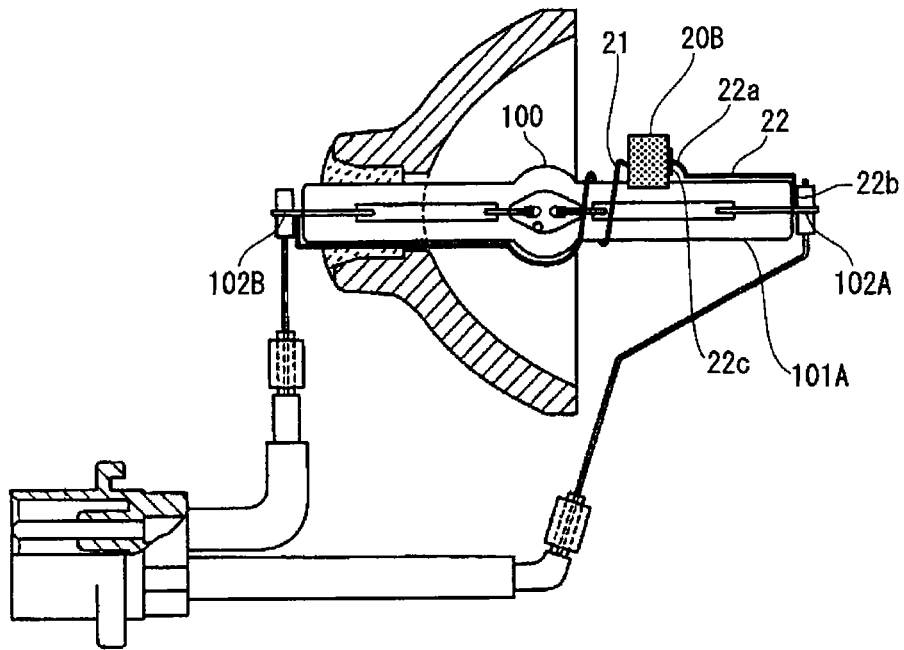
FIG. 5 is a partial cross-sectional view showing a structure of a lamp unit 1B pertaining to Embodiment 3.

Next, FIG. 5 is a partial cross-sectional view showing a structure of a lamp unit 1B pertaining to Embodiment 3. The lamp unit 1B is characterized in that a rectangular parallelepiped dielectric member 20B is provided on the first sealing part 101A of the lamp 10 and is in point contact with the metal wire 21 and a metal wire 22. The metal wire 21 and the metal wire 22 are respectively connected to the external lead wires 102B and 102A, which have their respective polarities. The upstream end of the metal wire 22 is connected to the external lead wire 102A, and a downstream end 22a of the metal wire 22 is connected to the dielectric member 20B via a pad 22c made of a metallic material. On the other hand, the metal wire 21 that is close to the light-emitting part 100 extends from the external lead wire 102B and is in point contact with the dielectric member 20B.

The lamp unit 1B with the above structure achieves the same effect as in Embodiment 1. Furthermore, since the dielectric member 20B, which has relative permittivity much higher than that of fused quartz, is in contact with the metal wires 21 and 22 having their respective polarities, upon lighting of the lamp 1B a relatively low applied voltage can cause a corona discharge and UV to occur. Thus, particularly excellent reduction of breakdown voltage can be expected.

In addition, according to experiments conducted by the inventors of the present invention, when the case where a metal wire was in contact with a particular side of a dielectric member was compared to the case where a metal wire was in contact with the opposite sides of the same dielectric member, the latter was confirmed to cause a corona discharge to occur at a lower voltage. By utilizing UV that occurs in accordance with the corona discharge, the lamp unit 1B can be expected to further reduce breakdown voltage.

Embodiments 4 and 5

Figure 6:
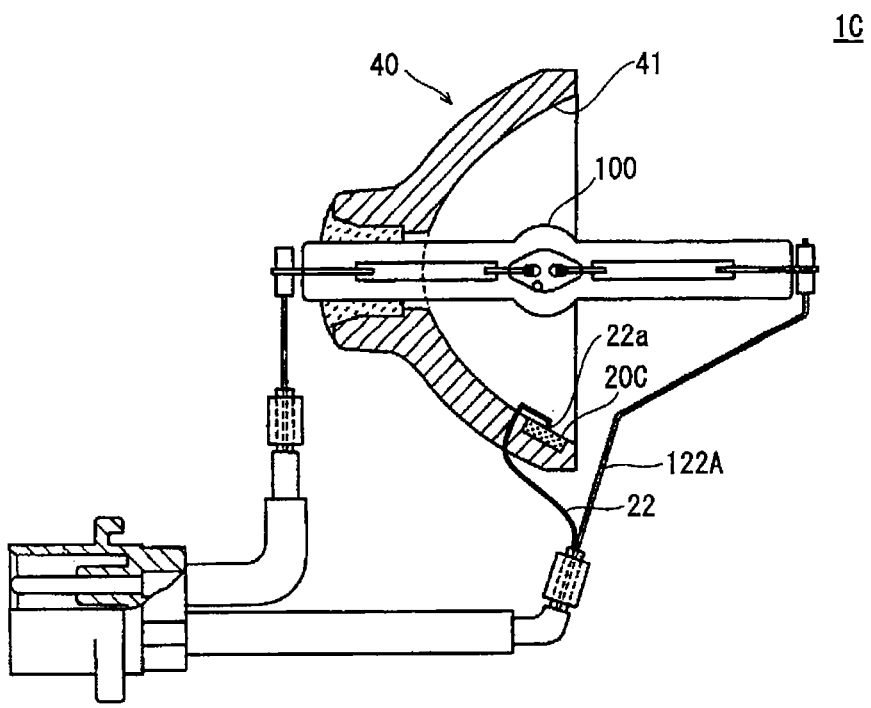
FIG. 6 is a partial cross-sectional view showing a structure of a lamp unit 1C pertaining to Embodiment 4.

Next, FIG. 6 is a partial cross-sectional view showing a structure of a lamp unit 1C pertaining to Embodiment 4.

The lamp unit 1C is characterized in that a thin dielectric member 20C is provided at the lower part of the reflective surface 41 of the reflector 40, the upstream end of the metal wire 22 is connected to the nickel wire 122A, and the downstream end 22a of the metal wire 22 is in point contact with the upper surface of the dielectric member 20C. Here, the metal wire 22 penetrates the reflector 40, but is not limited to this structure.

Figure 7:
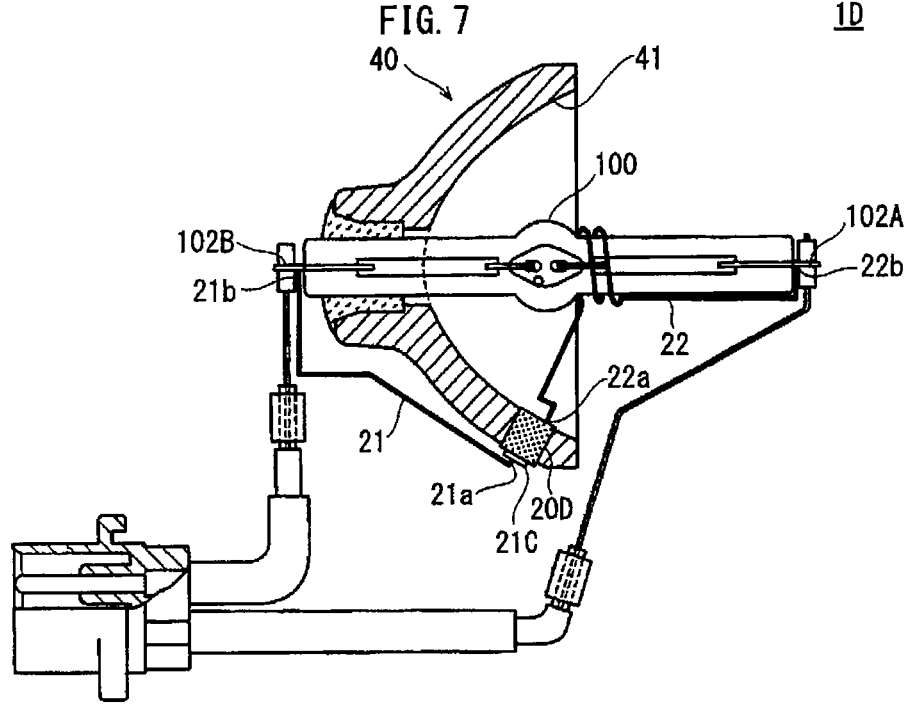
FIG. 7 is a partial cross-sectional view showing a structure of a lamp unit 1D pertaining to Embodiment 5.

FIG. 7 is a partial cross-sectional view showing a structure of a lamp unit 1D pertaining to Embodiment 5. The lamp unit 1D is the same as in Embodiment 3 in that a dielectric member 20D is embedded in the reflective surface 41 of the reflector 40. However, the upstream end of the metal wire 22 is connected to the external lead wire 102A, and the upper surface of the dielectric member 20D is in point contact with the downstream end 22a of the metal wire 22. Also, the upstream end of the metal wire 21 is connected to the external lead wire 102B, and the lower surface of the dielectric member 20D is in contact with the downstream end 21a of the metal wire 21 via a pad 21c.

In this case, since the dielectric member 20D is exposed both to the inside and to the outside of the reflector 40, when the metal wires 21 and 22 having their respective polarities are made to be in contact with the dielectric member 20D, one of the metal wires, i.e., the metal wire 21 can be disposed outside the reflector 40.

Accordingly, such a structure can reduce light blocked by the metal wires 21 and 22, compared to the case where both of the metal wires 21 and 22 having their respective polarities are disposed inside the reflector 40. This can reduce breakdown voltage even in a small lamp unit, while controlling reduction of luminous efficiency by providing the dielectric member 20D and the metal wires 21 and 22.

Since the dielectric member is disposed on the reflector, Embodiments 4 and 5 can reduce an amount of light blocked by the dielectric member compared to the case where the dielectric member is disposed in the vicinity of the lamp as in the above described Embodiment. As a result, this can reduce breakdown voltage even in a small lamp unit, while controlling reduction of luminous efficiency by providing the dielectric member 20D and the metal wires 21 and 22.

According to each of the lamp units 1C and 1D of Embodiments 3 and 4, a corona discharge and UV occur in the vicinity of a point at which the downstream end 22a of the metal wire and the upper surface of the dielectric members 20C or 20D are in contact with each other upon lighting of the lamp. The light-emitting part 100 of the lamp 10 is irradiated with the UV, and as a result, breakdown voltage can be reduced in the same manner as in Embodiment 1, compared to conventional art.

In addition, the lamp unit 1D of Embodiment 5 can be expected to further reduce breakdown voltage since the metal wires 22 and 21 having their respective polarities are in contact with the dielectric member 20D in the same manner as in Embodiment 3.

Also, since an area of each of the dielectric members 20C and 20D on the reflective surface 41 of the reflector 40 is very small, the lamp units 1C and 1D have a low risk of reducing an amount of light emitted from the reflector. This is considered as an advantage when compared to a structure according to which a discharge tube of a start-up assist member is provided extremely close to the lamp 10, like conventional art (Patent Literature 3 and the like), for example.

Embodiments 6-8

Figure 8:
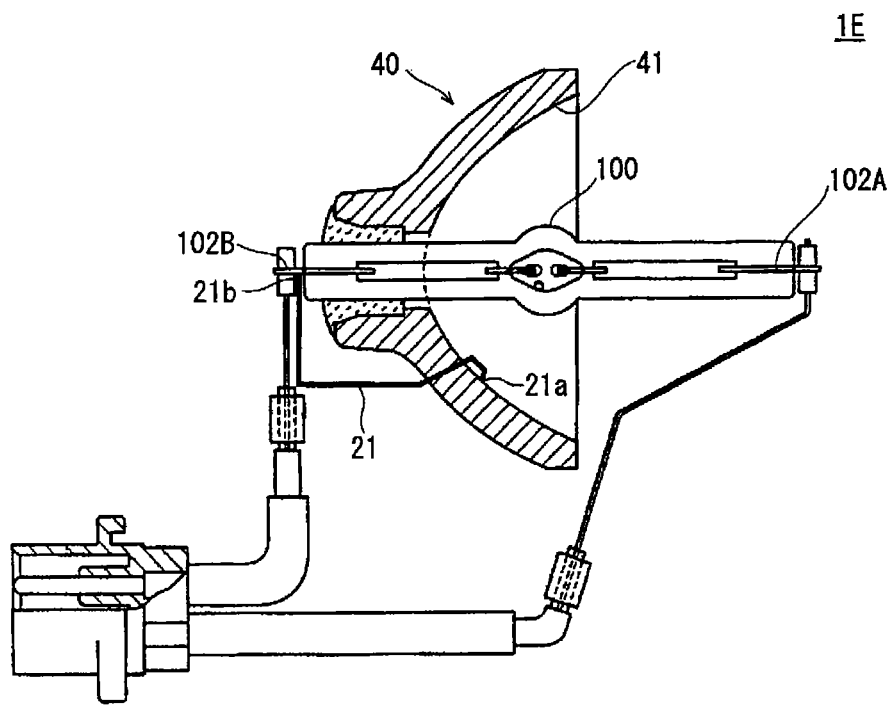
FIG. 8 is a partial cross-sectional view showing a structure of a lamp unit 1E pertaining to Embodiment 6.

Next, FIG. 8 is a partial cross-sectional view showing a structure of a lamp unit 1E pertaining to Embodiment 6.

The lamp unit 1E is characterized in that the metal wire 21 whose end 21b is connected to the external lead wire 102B penetrates the reflector 40 and the downstream end 21a of the metal wire 21 is in point contact with the lower part of the reflective surface 41.

Figure 9:
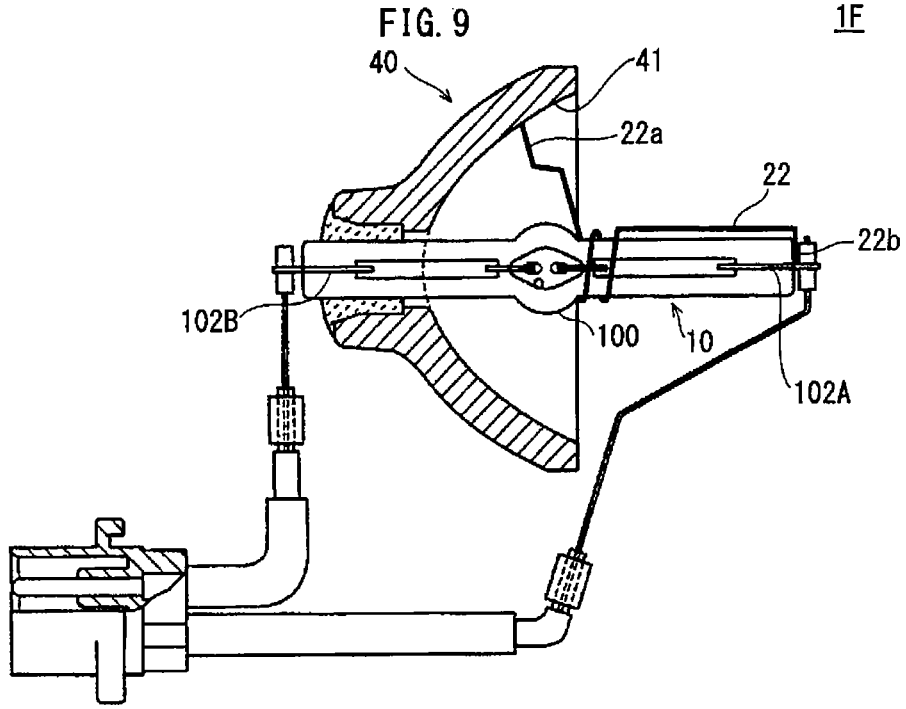
FIG. 9 is a partial cross-sectional view showing a structure of a lamp unit 1F pertaining to Embodiment 7.

On the other hand, FIG. 9 is a partial cross-sectional view showing a structure of a lamp unit 1F pertaining to Embodiment 7. Contrary to the lamp unit 1E, the metal wire 22 whose end 22b is connected to the external lead wire 102A is wound around the lamp 10 and then the downstream end 22a of the metal wire 22 is in point contact with the upper part of the reflective surface 41.

Figure 10:
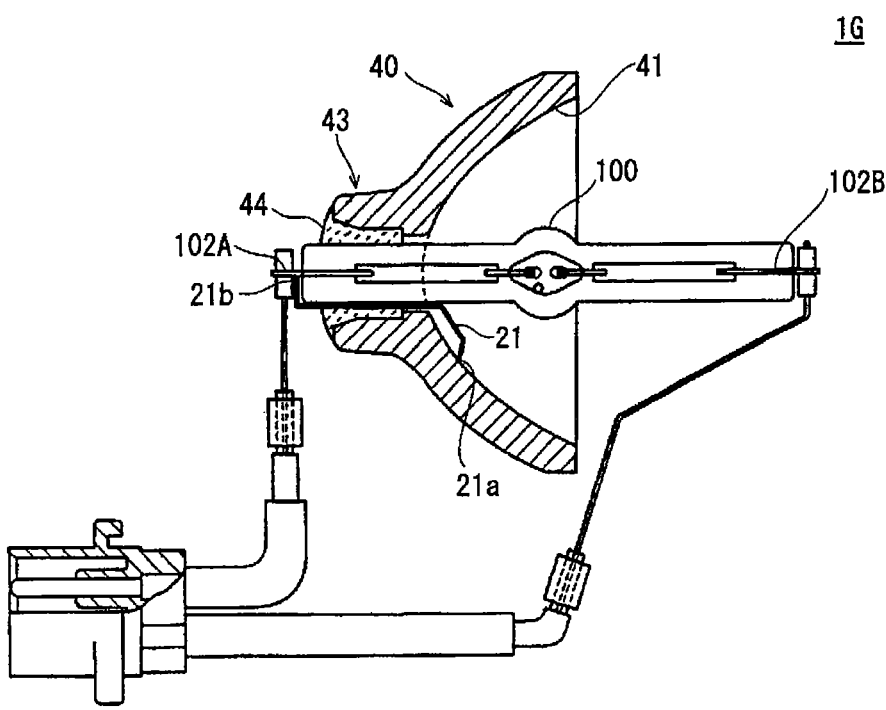
FIG. 10 is a partial cross-sectional view showing a structure of a lamp unit 1G pertaining to Embodiment 8.

Alternatively, a lamp unit 1G pertaining to Embodiment 8 in FIG. 10, which is basically the same as the lamp unit 1E, has a structure according to which the metal wire 21 is inserted through the adhesive agent 44 that is filled in the tube part 43 of the reflector 40.

The lamp units 1E, 1F, and 1G with the above respective structures each include the reflector 40 having the reflective surface 41 whose reflective film is made of dielectric multilayer film. In particular, when the dielectric multilayer film is made of titanium dioxide, the dielectric multilayer film acts as a dielectric member having relative permittivity that is higher than that of fused quartz. Therefore, in the case of each of the lamp units 1E and 1G, when a relatively low voltage is applied, a corona discharge and UV in accordance with the corona discharge occur in the vicinity of a point where the end 21a of the metal wire 21 and the dielectric multilayer film are in contact with each other. In the case of the lamp unit 1F, when a relatively low voltage is applied, a corona discharge and UV in accordance with the corona discharge occur in the vicinity of a point where the end 22a of the metal wire 22 and the dielectric multilayer film are in contact with each other. The light-emitting part 100 is irradiated with the UV and photoelectrons are generated inside the light-emitting part 100, and accordingly reduction of breakdown voltage can be realized.

Embodiment 9

Next, FIG. 11 is a partial cross-sectional view showing a structure of a lamp unit 1H pertaining to Embodiment 9.

The lamp unit 1H is characterized in that a dielectric member 20H is disposed on the surface of the reflective surface 41 of the reflector 40, an end 23b of a metal wire 23 is connected to a coated conducting wire 126C, which is an independent wire, and a downstream end 23a of the metal wire 23 is in point contact with the surface of the dielectric member 20H.

Upon lighting of the lamp unit 1H with the above structure, AC voltage is applied to the coated conducting wire 126C from an external source. Because of this, a corona discharge and UV occur between the downstream end of the metal wire 23 and the surface of the dielectric member 20H, and the light-emitting part 100 is irradiated with the UV. As a result, breakdown voltage of the light-emitting part 100 can be reduced. Note that after discharge starts, power needs to be supplied only to the coated conducting wires 126A and 126B, while power supplied to the coated conducting wire 126C may be stopped and normal lighting may be performed.

The lamp unit 1H with the above structure can be expected to have the same effect as the lamp units 1E-1G.

Note that though the lamp unit 1H shown in FIG. 11 is provided with the dielectric member 20H on the reflective surface, the lamp unit 1H can be applied to the cases where the dielectric member 20H is disposed on the lamp 10, the dielectric member 20H is disposed on a subreflector described later, the reflective surface of the reflector or the subreflector is a dielectric member, and so on.

(Structure of Dielectric Member and Metal Wire)

Next, the following describes a shape of the dielectric member and wiring of the metal wire in the present invention. FIGS. 12A-12G are each an enlarged cross-sectional diagram showing a structure of the principal parts of a dielectric member and a metal wire of a different one of configurations.

The shape of the dielectric member of the present invention is not particularly limited. For example, when the shape of the dielectric member is ring-shaped like in Embodiment 1, the dielectric member is easily fit onto the cylindrical first sealing part 101A of the high pressure discharge lamp 10, and the first sealing part 101A and the dielectric member are firmly fixed. On the other hand, when the shape of the dielectric member is a rectangular parallelepiped or a flat plate, the dielectric member is easily attached to or embedded in the reflective surface of the reflector 40.

In addition, a structure of the dielectric member is not limited to a single-layer structure composed of a single material. As shown in FIG. 12E, the dielectric member can be formed by layering two or more layers made of different materials. FIG. 12E shows a dielectric member 20C' having a two-layered structure that consists of layers 20C1 and 20C2. Here, a layer having the surface on which a corona discharge is to occur is made of a ceramic material with high relative permittivity. A layer having the opposite surface is not limited to be made of the ceramic material, and may be made of fused quartz, alumina, metal, and the like. Such a structure can be applied to the case where the reflective surface 41 of the reflector 40 and a reflective surface 46 of a subreflector 45 are formed as dielectric members with high relative permittivity.

Next, in Embodiment 1, basically as shown in FIG. 12A, the downstream end 22a of the metal wire 22 is in contact with the upper surface of the a rectangular parallelepiped dielectric member 20C (in addition, each of the downstream end 21a of Embodiment 2, the downstream end 22a of Embodiments 4, 5, and 13, the downstream end 23a of Embodiment 9, and a downstream end 24a of Embodiment 12 is configured in the same way). In this case, as shown in FIG. 12D, a plurality of ends 22a1, 22a2, and 22a3 of the metal wire 22 may be in contact with the dielectric member (in FIG. 12D, dielectric member 20C). Note that when a plurality of ends having the same potential are in contact with the dielectric member, all of the ends may be in contact with a particular surface of the dielectric member or each end may be in contact with a different surfaces of the dielectric member.

Alternatively, when two metal wires 21 and 22, and the like are in contact with the opposite surfaces of the dielectric member, as shown in FIG. 12B, the metal wires 21 or 22 can also be in contact with the dielectric member via the pad 21c. Here, FIG. 12B shows the dielectric member 20B of Embodiment 3, and Embodiment 5 has the same structure. In this case as well, as shown in FIG. 12F as a dielectric member 20D', a multi-layered dielectric member (in FIG. 12F, a layer structure dielectric member consisting of layers 20D1 and 20D2 that are made of different materials) may be used.

Alternatively, as shown in FIG. 12G, a three-layered structure dielectric member 20D" is possible. According to such a structure, between a pair of layers 20D3 and 20D5 that are made of the same material, a layer 20D4 made of a different material is layered.

Note that the pad 21c is a metal member for ensuring the electric field strength as a counter potential of the downstream end 22a of the metal wire 22, but is not essential. Accordingly, as shown in FIG. 12C, the pad 21c can be omitted. Note that as the metal member, sheet made of nickel can be used, for example.

Furthermore, the two metal wires 21 and 22 are not limited to be in contact with the opposite surfaces of the dielectric member. The metal wires 21 and 22 may be in contact with the adjacent surfaces of the dielectric member.

Embodiments 10 and 11

Figure 13:
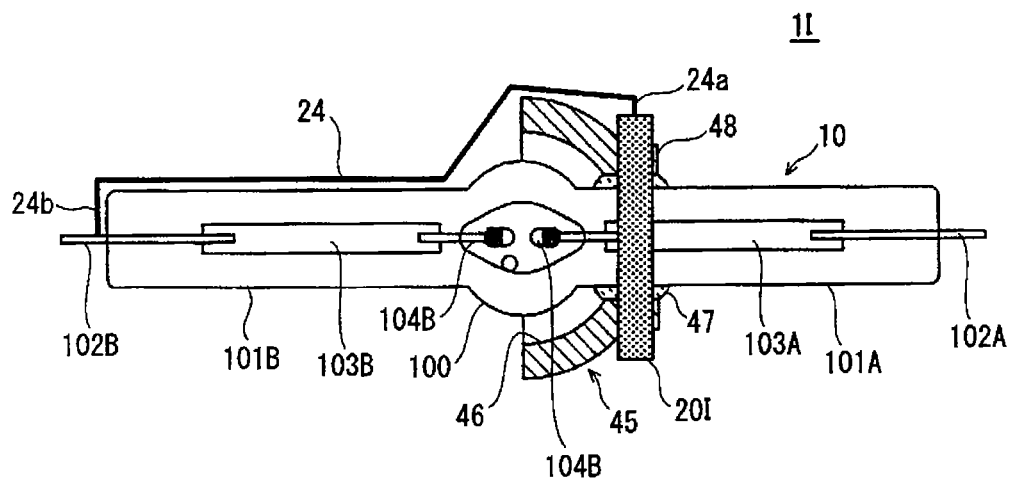
FIG. 13 is a partial cross-sectional view showing a structure of a lamp unit 1I pertaining to Embodiment 10.

FIG. 13 is a partial cross-sectional view showing a structure of a lamp unit 1I with a subreflector, pertaining to Embodiment 10 (only the subreflector 45 is shown in section).

According to the lamp 1I with the subreflector shown in FIG. 13, the first sealing part 101A of the lamp 10 is provided with the known subreflector 45 having the bowl-shaped reflective surface 46 so that reflected light is emitted toward the second sealing part 101B. In addition, a ring-shaped dielectric member 20I is disposed at a tube part 48 that is provided with a fixed part 47 for fixing the subreflector 45. The dielectric member 20I is fixed to the tube part 48 with unillustrated cement. Here, an end 24b of a metal wire 24 is connected to the external lead wire 102B of the lamp 10, and the downstream end 24a of the metal wire 24 is in point contact with the dielectric member 20I.

Upon lighting of the lamp 1I with the subreflector with the above structure starts, a corona discharge occurs between the downstream end 24a of the metal wire 24 and the ring-shaped dielectric member 20I. In accordance with the corona discharge, UV occurs. The light-emitting part 100 is irradiated directly with the UV, or UV reflected by the reflective surface of the reflector. This causes discharge to start between the pair of discharge electrodes 104A and 104B. According to the lamp 1I with the subreflector, discharge occurs when a sufficiently low voltage is applied, and as a result, reduction of breakdown voltage can be realized.

Figure 14:
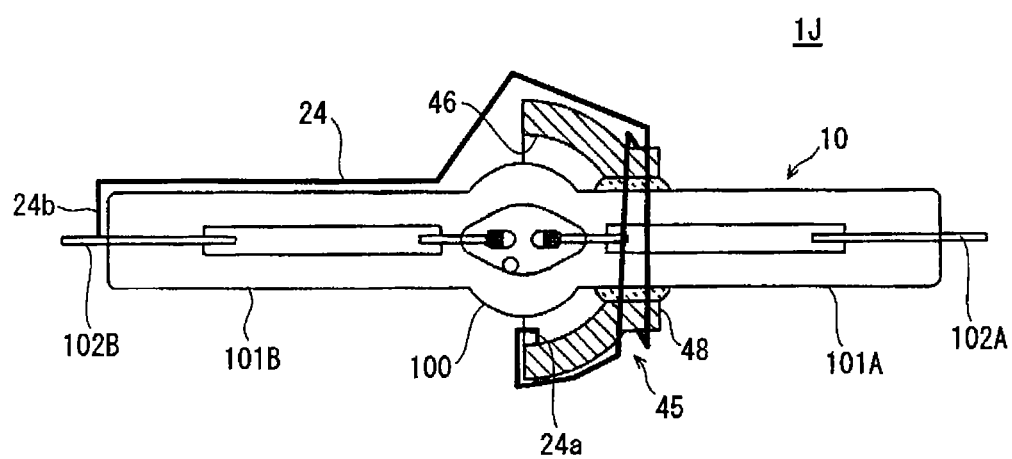
FIG. 14 is a partial cross-sectional view showing a structure of a lamp unit 1J pertaining to Embodiment 11.

A lamp 1J with the subreflector pertaining to Embodiment 11 shown in FIG. 14 is almost the same as the lamp 1I with the subreflector pertaining to Embodiment 10, apart from the following two points: the reflective film of the reflective surface 46 of the subreflector 45 is a dielectric multilayer film made of titanium dioxide; and the downstream side 24a of the metal wire 24 is in contact with the reflective surface 46.

The lamp unit 1J with the above structure can be expected to have the same effect as in Embodiment 8. In addition, the lamp 1J with the subreflector is characterized in that there is no restriction on a position of the dielectric member on the reflective surface 46 of the subreflector 45 having relatively a small area, and therefore, a reflection effect of the subreflector 45 can be particularly excellently maintained.

Embodiments 12 and 13

Figure 15:
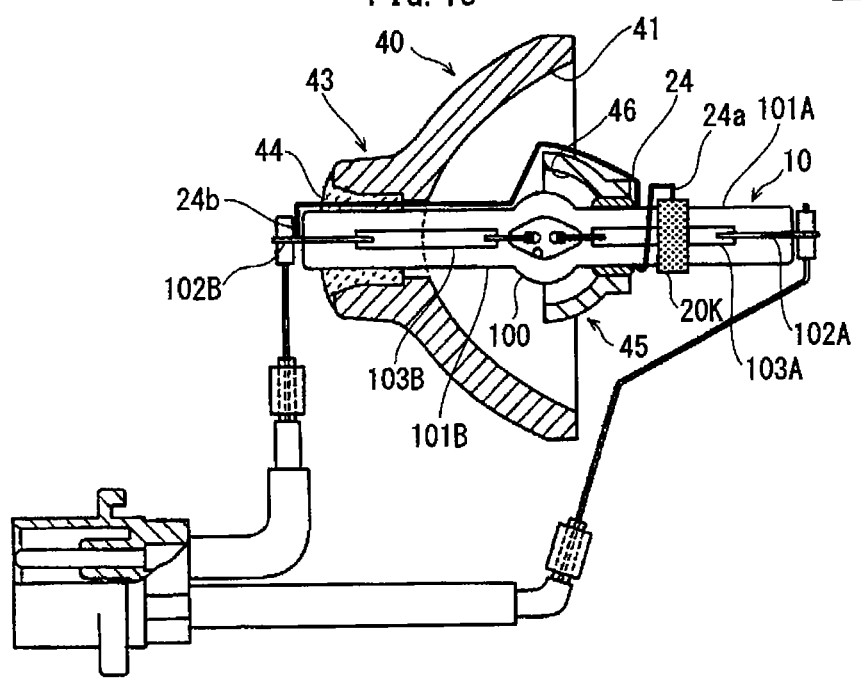
FIG. 15 is a partial cross-sectional view showing a structure of a reflector and a lamp unit 1K pertaining to Embodiment 12.

FIG. 15 is a partial cross-sectional view showing a structure of a lamp unit 1K pertaining to Embodiment 12 (only the subreflector 45 and the reflector 40 are shown in section).

According to a structure shown in FIG. 15, a ring-shaped dielectric member 20K is fit onto the outer surface of the first sealing part 101A, an upstream end 24b of the metal wire 24 is connected to the external lead wire 102B, and the downstream end 24a of the metal wire 24 is in point contact with the upper surface of the dielectric member 20K. The metal wire 24 is disposed so as to penetrate the adhesive agent 44 filled with the tube part 43 of the reflector 40.

According to the lamp unit 1K with the above structure, upon lighting of the lamp, a corona discharge occurs at the point at which the downstream end 24a is in point contact with the upper surface of the dielectric member 20K and inside the first sealing part 101A provided with the dielectric member 20K, and the light-emitting part 100 is irradiated with UV occurring in accordance with the corona discharge. As a result, discharge starts when a relatively low voltage is applied.

In addition, the metal wire shown in FIG. 15 runs between the tube part 43 of the reflector 40 and the second sealing part 101B, but a structure of the metal wire 24 is not limited to this. The metal wire 24 may extend toward the first sealing part 101A by detouring outside of the reflector 40. Note that when the metal wire 24 runs between the tube part 43 of the reflector 40 and the second sealing part 101B, the metal wire 24 can be fixed between the tube part 43 of the reflector 40 and the second sealing part 101B, and accordingly, the metal wire 24 can be easily disposed.

Figure 16:
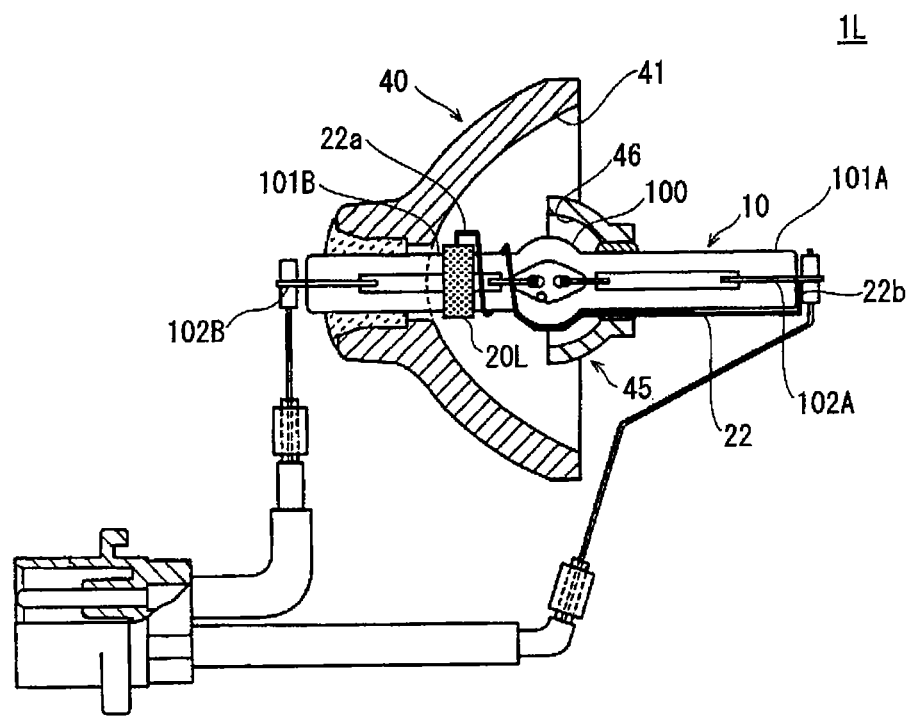
FIG. 16 is a partial cross-sectional view showing a structure of a reflector and a lamp unit 1L pertaining to Embodiment 13.

FIG. 16 is a partial cross-sectional view showing a structure of a lamp unit 1L pertaining to Embodiment 13 (only the subreflector 45 and the reflector 40 are shown in section). The lamp unit 1L differs from the lamp unit 1K in that a ring-shaped dielectric member 20L is fit onto the second sealing part 101B, the upstream end 22b of the metal wire 22 is connected to the external lead wire 102A, and the downstream end 22a of the metal wire 22 is in point contact with the upper surface of the dielectric member 20L.

The lamp unit 1L pertaining to Embodiment 13 with the above structure can be expected to have the same effect as in Embodiment 12.

Note that when the lamp 10 includes a dielectric member, any one of the first sealing part 101A and the second sealing part 102B may be provided with the dielectric member. However, it should be noted that if the dielectric member 20L greatly blocks light emitted from the light-emitting part 100, luminous efficiency is reduced. In Embodiment 13, since light emitted from the subreflector 45 slightly grazes the dielectric member 20L, the outer diameter of the dielectric member 20L is preferred to be smaller than the largest outer diameter of the lamp 10.

In addition, the metal wire 22 shown in FIG. 16 runs between the subreflector 45 and the first sealing part 101A, but a structure of the metal wire 22 is not limited to this. The metal wire 22 may extend toward the second sealing part 101B by detouring outside of the subreflector 45. Note that when the metal wire 22 runs between the subreflector 45 and the first sealing part 101A, the metal wire 22 can be fixed between the subreflector 45 and the first sealing part 101A, and accordingly, the metal wire 22 can be easily disposed.

Embodiments 14 and 15

In addition to the above described lamp unit that is used for an image display apparatus, the present invention can be applied to an ordinary domestic metal halide lamp that is used in stores, large-scale facilities, or the like.

Figure 17:
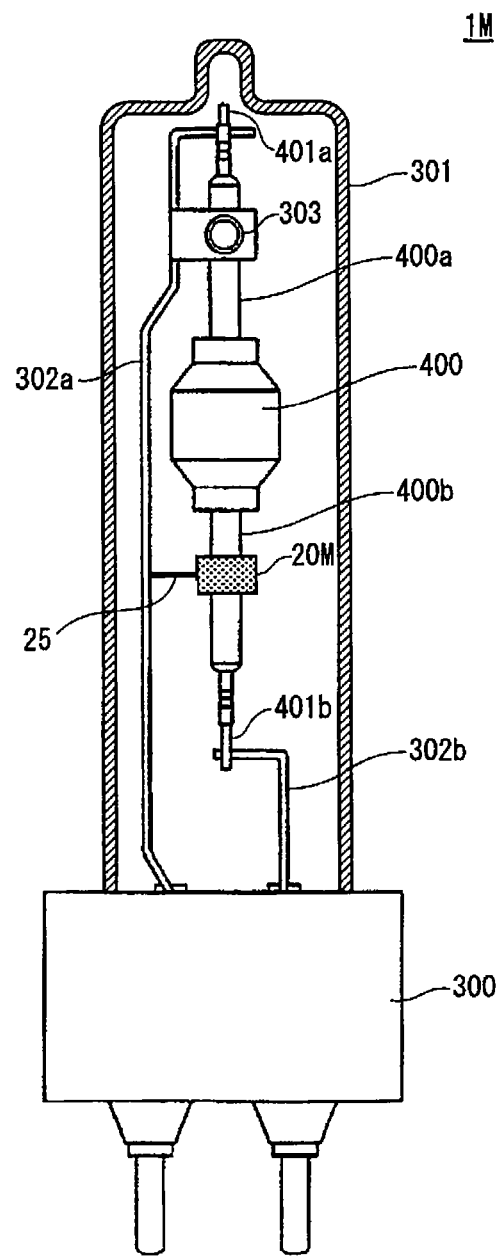
FIG. 17 is a partial cross-sectional view showing a structure of a metal halide lamp 1M pertaining to Embodiment 14.

FIG. 17 is a partial cross-sectional view showing a structure of a metal halide lamp 1M pertaining to Embodiment 14 (only an outer tube 301 is shown in section).

According to the metal halide lamp 1M, power suppliers 401a and 401b are respectively exposed outside a pair of narrow tubes 400a and 400b extending from an arc tube 400 made of fused quartz. To the power suppliers 401a and 401b, power supply lines 302a and 302b are connected, respectively. The arc tube 400 encloses therein a noble gas such as Ar acting as discharge gas upon lighting of the lamp, and a light-emitting material composed of metal halide. The outer tube 301 has an opening that is sealed with a base 300. The getter 303 absorbs impurities such as oxygen and vapor in the outer tube 301.

Here, the metal halide lamp 1M is provided with a dielectric member 20M on the outer surface of a sealant made of fused quartz. The sealant covers one of the power suppliers 401b. The metal wire 25 extending from the power supply line 302a is in point contact with the outer surface of the dielectric member 20M.

Figure 18:
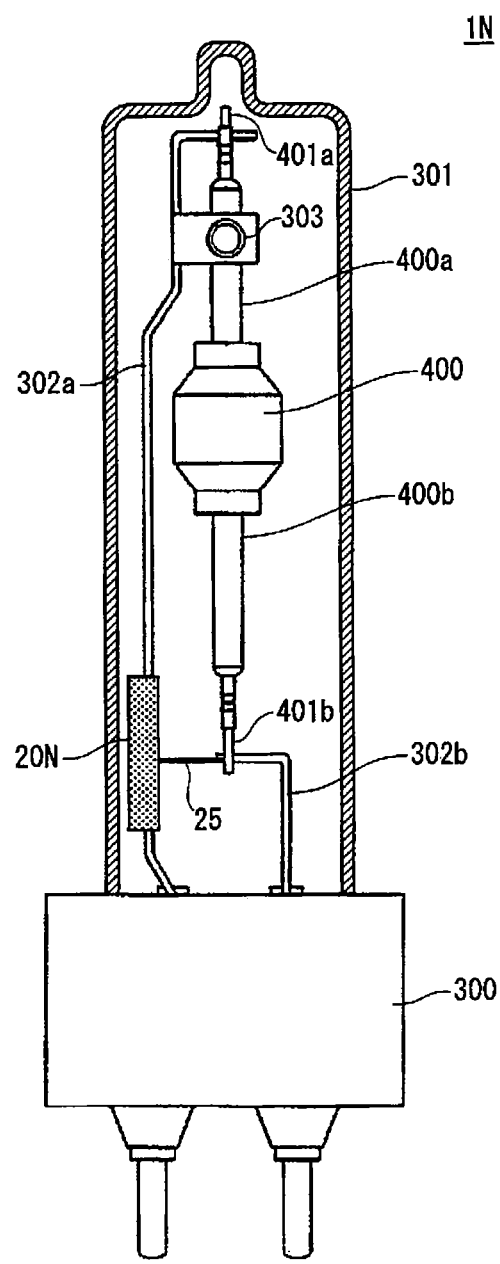
FIG. 18 is a partial cross-sectional view showing a structure of a metal halide lamp 1N pertaining to Embodiment 15.

FIG. 18 is a partial cross-sectional view showing a structure of a metal halide lamp 1N pertaining to Embodiment 15 (only the outer tube 301 is shown in section).

The metal halide lamp 1N differs from the metal halide lamp 1M in that a dielectric member is provided close to a power supply line and the metal wire connected to the power supplier (power supply line) is in point contact with the surface of the dielectric member.

Both of the metal halide lamps 1M and 1N can be expected to have the same effect as in Embodiments 1-13.

<Embodiment of Lamp System>

Figure 21:
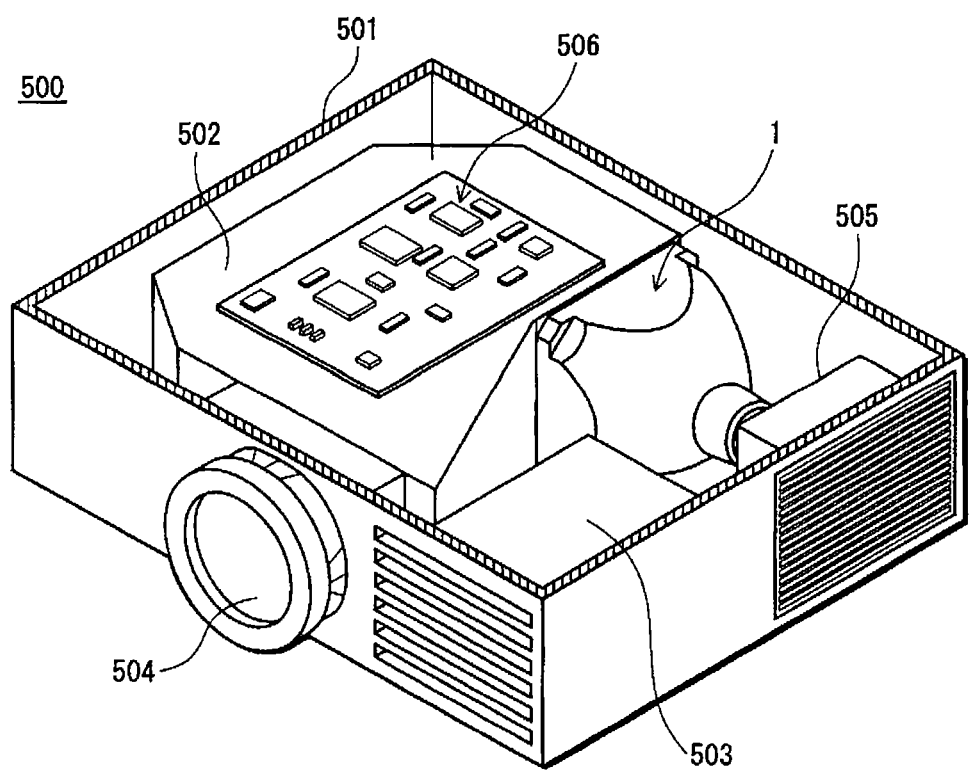
FIG. 21 shows an example structure of a lamp system (image display apparatus) of the present invention.
Figure 22:
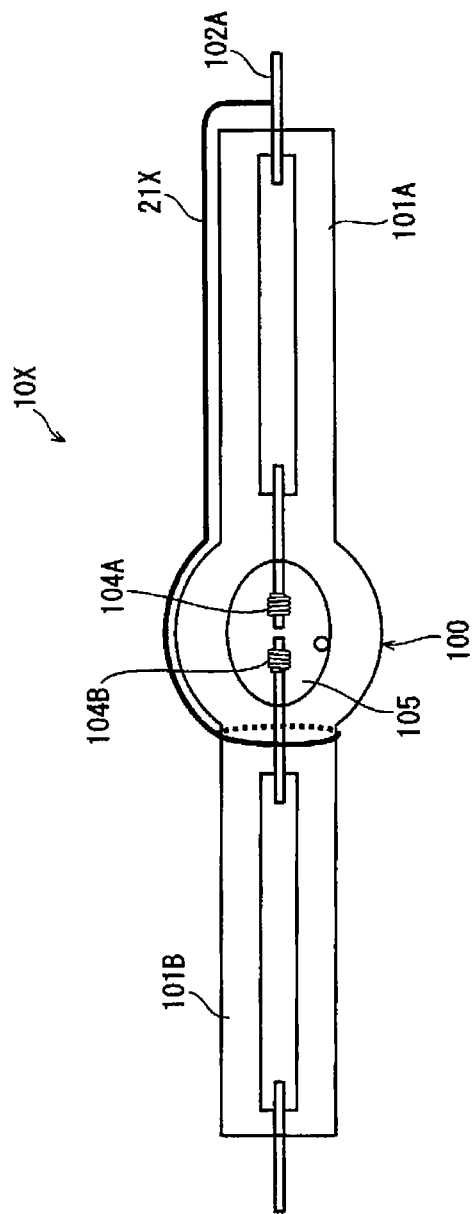
FIG. 22 shows a conventional example of placement of an adjacent conductor to a lamp.

FIG. 21 is a partly-broken perspective view showing an image display apparatus 500 provided with a lamp system that is composed of the lamp unit 1 of Embodiment 1 and a lighting circuit. The image display apparatus 500 is shown with a top plate thereof removed, in order to clearly show the inside thereof. The image display apparatus 500 shown in FIG. 21 is a projection liquid crystal front projector that projects images towards a screen (unillustrated) placed in front of the image display apparatus 500. The image display apparatus 500 houses, in a housing 501, the lamp unit 1 as a light source, an optical unit 502, a control unit 503, a projection lens 504, a cooling fan unit 505, power source unit 506, and so on. The optical unit 502 includes three liquid crystal panels (unillustrated) and the like. The control unit 503 controls the liquid crystal panels and the like. The power source unit 506 supplies power provided from a commercial power supply to the control unit 503 and the lighting circuit (unillustrated) of the lamp unit 1.

Since the image display apparatus 500 includes the lamp unit 1 whose breakdown voltage is reduced and the lamp system that starts when a low voltage is applied, the image display apparatus 500 can be reduced in size and cost compared to a conventional image display apparatus.

Note that naturally, a lamp unit applied to the image display apparatus 500 may be a lamp unit of one of the other embodiments.

In addition, the number of dielectric members is not limited to one, and a plurality of dielectric members may be provided. In this case, like in Embodiment 1, the plurality of dielectric members may be located on the sealing part of the lamp or located both on the sealing part and the reflector (or subreflector). Furthermore, a plurality of dielectric members may be provided on the reflector.

<Other Considerations>

Embodiments of the present invention each describe an example in which the dielectric member and the downstream end of the metal wire are in contact with each other so that discharge occurs therebetween when a voltage is applied to cause the high pressure discharge lamp to start discharging. However, the same effect can be achieved when the dielectric member and the downstream end of the metal wire are close to each other so that discharge occurs therebetween when a voltage is applied to cause the high pressure discharge lamp to start discharging.

Note that the state in which "the dielectric member and the downstream end of the metal wire are close to each other so that discharge occurs therebetween when a voltage is applied to cause the high pressure discharge lamp to start discharging" indicates, to be specific, that the smallest distance between the dielectric member and the downstream end of the metal wire is preferred to be equal to or less than 2 mm. In this case, even when the dielectric member and the metal wire are not in contact with each other, breakdown voltage can be more reliably reduced.

According to the present invention, when the dielectric member is disposed on the outer surface of one of the sealing parts of the lamp and the downstream end of the metal wire is close to or in contact with one surface of the dielectric member, the metal wire is located on the upper surface of the dielectric member so that the dielectric member is located between the downstream end of the metal wire and the metal foil and the discharge electrode that are enclosed in the sealing part of the lamp. However, the structure is not limited to this, and the similar effect is achieved when the downstream end of the metal wire is close to or in contact with the side surface of the dielectric member. In this case, if the downstream end of the metal wire is close to or in contact with the surface of the dielectric member that is closest to the light-emitting part, there is an advantage that the light-emitting part is excellently irradiated with UV that occurs in accordance with a corona discharge that occurs upon lighting of the lamp.

Furthermore, in the present invention, the dielectric member may have various shapes such as a rectangular parallelepiped, a cylinder, a prism, a sphere, and one of the above shapes having a cut-off part.

For example, when the dielectric member is ring-shaped and is fit onto one of the sealing parts of the lamp, the dielectric member may have a slit extending in a longitudinal direction of the sealing part. In this case, the dielectric member can easily handle thermal expansion and contraction of the sealing part, and increase a force that fixes the dielectric member to the sealing part.

When the dielectric member is fixed to the lamp, the reflector, or the like via an adhesive agent, the surface with which the adhesive agent to fix the dielectric member is in contact may be convex and concave. In this case, a force that fixes the dielectric member can be increased.

In addition, when the dielectric member is disposed on the outer surface of one of the sealing parts of the lamp, the dielectric member may act as a heat keeping member. In this case, when a lighting power much lower than the rated power (for example, equal to or less than 50%) is applied to light the lamp, the dielectric member prevents temperature of the coldest part in the discharge space from decreasing too much, and accordingly the dielectric member can prevent the luminous flux from decreasing.

In this case, both of the sealing parts may be provided with dielectric members, and one of the dielectric members may not be electrically connected to with any member. Note that a heat keeping member other than the dielectric member, such as metal coil, may be provided on the outer surface of one of the sealing parts of the lamp.

In addition, when the present invention is applied to a high pressure discharge lamp, lead wires and sleeves are not essential, and these lead wires and sleeves may not be provided.

Alternatively, only lead wires may be provided while sleeves may not be provided, and the lead wires may be directly electrically connected to the external lead wires without the sleeves.

INDUSTRIAL APPLICABILITY

The high pressure discharge lamp with the start-up assist member, the lamp unit, the lamp system, and the projector pertaining to the present invention reduce breakdown voltage of the lamp in particular, compared to conventional art. Therefore, the lamp can be widely used for image display apparatuses such as a liquid crystal projector and a digital light processing (DLP) projector. When the dielectric member is located on the lamp, the lamp can be widely used for various small image display apparatuses, and therefore, the present invention has a broad range of industrial applicability.

REFERENCE SIGNS LIST 1, 1A-1H lamp unit (lamp with reflector)
1I, 1J lamp unit (lamp with subreflector)
1K, 1L lamp unit (lamp with reflector and subreflector)
1M, 1N metal halide lamp
10, 10X high pressure discharge lamp
20, 20A-20N dielectric member
20X experimental dielectric member
21X adjacent conductor
21-25 metal wire
21a-24a upstream end
21b-24b, 52a downstream end
22c pad
40 reflector
41, 46 reflective surface
45 subreflector
50 experimental trigger member
51 experimental sealing part
52 experimental metal wire
100 light-emitting part
101A first sealing part
101B second sealing part
102A, 102B external lead wire
103A, 103B metal foil
104A, 104B discharge electrode
105 discharge space
107A, 107B electrode assembly
108 discharge container (envelope)
112a, 112b electrode assembly
126A-126C coated conducting wire
200 first layer
201 opening
500 lamp system (projection front projector)

The invention claimed is:

1. A lamp unit comprising:
a high pressure discharge lamp that includes an envelope having a discharge space therein and a pair of discharge electrodes exposed to the discharge space;
a reflector that reflects light emitted from the high pressure discharge lamp and
a start-up assist member that assists the high pressure discharge lamp in starting up, wherein
the envelope includes a light-emitting part enclosing the discharge space, and a first sealing part and a second sealing part that are connected to the light-emitting part,
the first sealing part and the second sealing part each enclose a metal foil,
from one end of each metal foil, a corresponding discharge electrode extends into the discharge space,
from the other end of each metal foil, an external lead wire extends so as to be partly exposed outside a corresponding sealing part,
the start-up assist member includes a first metal wire and a dielectric member, one end of the first metal wire being electrically connected to one of the discharge electrodes of the high pressure discharge lamp, and the dielectric member having relative permittivity higher than relative permittivity of the envelope,
the dielectric member is located on an outer surface of one of the first sealing part and the second sealing part, and
the one end of the first metal wire is electrically connected to an exposed portion of the external lead wire corresponding to the other one of the first sealing part and the second sealing part, and
the other end of the first metal wire and the dielectric member are close to or in contact with each other so that discharge occurs therebetween when a voltage is applied to cause the high pressure discharge lamp to start discharging.

2. The lamp unit of claim 1, wherein
the high pressure discharge lamp is provided with a subreflector that reflects, toward the reflector, the light emitted from the light-emitting part.

3. The lamp unit of claim 1, wherein
the first sealing part and the second sealing part each have a shape of a cylinder, an elliptic cylinder, or a flat plate, and the dielectric member is ring-shaped and fit onto the outer surface of the one of the first sealing part and the second sealing part.

4. The lamp unit of claim 3, wherein
an outer diameter of the dielectric member is equal to or less than a largest outer diameter of the light-emitting part.

5. The lamp unit of claim 1, wherein
the dielectric member has a shape of a rectangular parallelepiped.

6. The lamp unit of claim 1, wherein
the envelope is made of fused quartz.

7. The lamp unit of claim 1, wherein
the dielectric member contains a titanium compound.

8. The lamp unit of claim 7, wherein
the titanium compound is at least one selected from the group consisting of titanium dioxide, barium titanate, and strontium titanate.

9. The lamp unit of claim 1, wherein
an end of the first metal wire or a part of a side surface of the first metal wire is resiliently biased so as to be close to or in contact with the dielectric member.

10. The lamp unit of claim 1, wherein
the first metal wire is wound around the high pressure discharge lamp.

11. The lamp unit of claim 1, wherein
the other of the external lead wires is connected to a second metal wire, the other external lead wire having a polarity opposite a polarity of the one external lead wire connected to the first metal wire, and
the dielectric member is close to or in contact with the second metal wire.

12. A lamp system according to which a lighting circuit is electrically connected to the high pressure discharge lamp of claim 1.

13. A projector provided with the lamp system of claim 12.

14. A lamp unit comprising:
a high pressure discharge lamp that includes an envelope having a discharge space therein, and a pair of discharge electrodes exposed to the discharge space;
a reflector that reflects light emitted from the high pressure discharge lamp; and
a start-up assist member that assists the high pressure discharge lamp in starting up, wherein
the envelope includes a light-emitting part enclosing the discharge space, and a first sealing part and a second sealing part that are connected to the light-emitting part,
the first sealing part and the second sealing part each enclose a metal foil,
from one end of each metal foil, a corresponding discharge electrode extends into the light-emitting part,
from the other end of each metal foil, an external lead wire extends so as to be partly exposed outside a corresponding one of the first sealing part and the second sealing part,
the start-up assist member includes a first metal wire and a dielectric member, one end of the first metal wire being electrically connected to one of the discharge electrodes of the high pressure discharge lamp, the dielectric member having relative permittivity higher than relative permittivity of the envelope,
the dielectric member is located on a reflective surface of the reflector,
the one end of the first metal wire is electrically connected to an exposed portion of the external lead wire corresponding to one of the first sealing part and the second sealing part and
the other end of the first metal wire and the dielectric member are close to or in contact with each other so that discharge occurs therebetween when a voltage is applied to cause the high pressure discharge lamp to start discharging.

15. A lamp system according to which a lighting circuit is electrically connected to the high pressure discharge lamp of claim 14.

16. A lamp unit comprising:
a high pressure discharge lamp that includes an envelope having a discharge space therein, and a pair of discharge electrodes exposed to the discharge space;
a reflector that reflects light emitted from the high pressure discharge lamp; and a start-up assist member that assists the high pressure discharge lamp in starting up, wherein
the envelope includes a light-emitting part enclosing the discharge space, and a first sealing part and a second sealing part that are connected to the light-emitting part,
the first sealing part and the second sealing part each enclose a metal foil,
from one end of each metal foil, a corresponding discharge electrode extends into the light-emitting part, from the other end of each metal foil, an external lead wire extends so as to be partly exposed outside a corresponding sealing part, the start-up assist member includes a first metal wire and a dielectric member, one end of the first metal wire being electrically connected to one of the discharge electrodes of the high pressure discharge lamp, the dielectric member having relative permittivity higher than relative permittivity of the envelope, the high pressure discharge lamp is provided with a subreflector that reflects, toward the reflector, the light emitted from the light-emitting part, and the dielectric member is located on a surface of the subreflector.

17. The lamp unit of claim 16, wherein
the dielectric member is a reflective film of the subreflector.

18. A lamp system according to which a lighting circuit is electrically connected to the high pressure discharge lamp of claim 16.

19. A high pressure discharge lamp with a start-up assist member comprising:

a high pressure discharge lamp that includes an envelope having a discharge space therein, and a pair of discharge electrodes exposed to the discharge space; and a start-up assist member that assists the high pressure discharge lamp in starting up, wherein the envelope includes a light-emitting part enclosing the discharge space, and a first sealing part and a second sealing part that are connected to the light-emitting part, the first sealing part and the second sealing part each enclose a metal foil, from one end of each metal foil, a corresponding discharge electrode extends into the discharge space, from the other end of each metal foil, an external lead wire extends so as to be partly exposed outside a corresponding sealing part, the start-up assist member includes a first metal wire and a dielectric member, one end of the first metal wire being electrically connected to one of the discharge electrodes of the high pressure discharge lamp, the dielectric member having relative permittivity higher than the relative permittivity of the envelope, the dielectric member is located on an outer surface of one of the first sealing part and the second sealing part, the one end of the first metal wire is electrically connected to an exposed portion of the external lead wire corresponding to the other one of the first sealing part and the second sealing part, and the other end of the first metal wire and the dielectric member are close to or in contact with each other so that discharge occurs therebetween when a voltage is applied to cause the high pressure discharge lamp to start discharging.

20. A lamp system according to which a lighting circuit is electrically connected to the high pressure discharge lamp of claim 19.

21. A lamp unit comprising:

a high pressure discharge lamp that includes an envelope having a discharge space therein, and a pair of discharge electrodes exposed to the discharge space;

a reflector that reflects light emitted from the high pressure discharge lamp; and a start-up assist member that assists the high pressure discharge lamp in starting up, wherein the start-up assist member includes a first metal wire and a dielectric member, one end of the first metal wire being electrically connected to an external wiring to which voltage is applied upon lighting of the high pressure discharge lamp, the dielectric member having a relative permittivity higher than relative permittivity of the envelope, the dielectric member is located on a reflective surface of the reflector, and the other end of the first metal wire and the dielectric member are close to or in contact with each other so that discharge occurs therebetween when a voltage is applied to cause the high pressure discharge lamp to start discharging.

* * * * *

UNITED STATES PATENT AND TRADEMARK OFFICE
CERTIFICATE OF CORRECTION

PATENT NO. : 8,690,360 B2  
APPLICATION NO. : 13/393786  
DATED : April 8, 2014  
INVENTOR(S) : Syunsuke Ono et al.

It is certified that error appears in the above-identified patent and that said Letters Patent is hereby corrected as shown below:

On the Title Page:  
Insert  
--(30) Foreign Application Priority Data  
   Dec. 27, 2010   (JP) ........................2010-290895--.

Signed and Sealed this  
Sixteenth Day of September, 2014

Michelle K. Lee  
*Deputy Director of the United States Patent and Trademark Office*